US009525774B2

(12) United States Patent
Silver

(10) Patent No.: US 9,525,774 B2
(45) Date of Patent: *Dec. 20, 2016

(54) METHODS, SYSTEMS, AND PRODUCTS FOR SUPPRESSION OF ALERTS

(71) Applicant: AT&T Intellectual Property I, L.P., Atlanta, GA (US)

(72) Inventor: Edward M. Silver, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/827,277

(22) Filed: Aug. 15, 2015

(65) Prior Publication Data

US 2015/0365524 A1    Dec. 17, 2015

Related U.S. Application Data

(63) Continuation of application No. 14/108,433, filed on Dec. 17, 2013, now Pat. No. 9,137,382, which is a continuation of application No. 12/259,545, filed on Oct. 28, 2008, now Pat. No. 8,619,954, which is a continuation of application No. 10/673,949, filed on Sep. 29, 2003, now Pat. No. 7,443,967.

(51) Int. Cl.
| | |
|---|---|
| *H04W 4/12* | (2009.01) |
| *H04M 3/42* | (2006.01) |
| *H04M 3/02* | (2006.01) |
| *H04M 3/428* | (2006.01) |
| *H04M 11/00* | (2006.01) |

(52) U.S. Cl.
CPC ........... *H04M 3/42068* (2013.01); *H04M 3/02* (2013.01); *H04M 3/42042* (2013.01); *H04M 3/4288* (2013.01); *H04M 11/00* (2013.01); *H04M 11/002* (2013.01); *H04W 4/12* (2013.01); *H04M 3/4211* (2013.01); *H04M 2201/14* (2013.01)

(58) Field of Classification Search
CPC .. H04M 3/02; H04M 3/4288; H04M 3/42042; H04M 3/42068; H04M 11/00; H04M 3/4211; H04M 2201/14; H04W 4/12
USPC .............. 455/415; 379/106.09, 90.01, 93.05, 379/93.06, 93.07, 93.35, 215.01, 142.08, 88.19, 379/196, 199
See application file for complete search history.

(56) References Cited

U.S. PATENT DOCUMENTS

| | | | |
|---|---|---|---|
| 4,266,098 A | 5/1981 | Novak | |
| 4,277,649 A | 7/1981 | Sheinbein | |
| 4,468,541 A | 8/1984 | Cohen | |
| 4,598,179 A * | 7/1986 | Clark | .................... H04M 1/665 |
| | | | 379/199 |
| 4,791,664 A | 12/1988 | Lutz | |
| 4,802,202 A | 1/1989 | Takahashi et al. | |
| 4,817,133 A | 3/1989 | Takahashi et al. | |
| 4,845,743 A | 7/1989 | Lutz | |
| 4,850,013 A | 7/1989 | Rose | |
| 4,893,329 A | 1/1990 | O'Brien | |
| 4,937,852 A | 6/1990 | Manzarek | |

(Continued)

*Primary Examiner* — Melur Ramakrishnaiah
(74) *Attorney, Agent, or Firm* — Scott P. Zimmerman, PLLC

(57) ABSTRACT

Audible alerts are suppressed for subsequent calls from a calling address. An initial audible alert is processed for an initial call from the calling address. Subsequent audible alerts from the same calling address are suppressed, such that subsequent calls from the calling address may fail to alert. Visual alerts may still be processed.

20 Claims, 16 Drawing Sheets

(56) References Cited

U.S. PATENT DOCUMENTS

| | | |
|---|---|---|
| 5,029,196 A | 7/1991 | Morganstein |
| 5,109,405 A | 4/1992 | Morganstein |
| 5,157,712 A | 10/1992 | Wallen, Jr. |
| 5,161,181 A | 11/1992 | Zwick |
| 5,200,994 A | 4/1993 | Sasano et al. |
| 5,239,575 A | 8/1993 | White et al. |
| 5,309,028 A | 5/1994 | Brown et al. |
| 5,329,578 A | 7/1994 | Brennan et al. |
| 5,341,411 A | 8/1994 | Hashimoto |
| 5,347,574 A | 9/1994 | Morganstein |
| 5,351,289 A | 9/1994 | Logsdon et al. |
| 5,361,295 A | 11/1994 | Solomon et al. |
| 5,388,150 A | 2/1995 | Schneyer et al. |
| 5,425,092 A | 6/1995 | Quirk |
| 5,446,785 A | 8/1995 | Hirai |
| 5,452,346 A | 9/1995 | Miyamoto |
| 5,467,388 A | 11/1995 | Redd, Jr. et al. |
| 5,490,205 A | 2/1996 | Kondo et al. |
| 5,497,414 A | 3/1996 | Bartholomew |
| 5,533,106 A | 7/1996 | Blumhardt |
| 5,535,265 A | 7/1996 | Suwandhaputra |
| 5,537,657 A | 7/1996 | King, III |
| 5,546,447 A | 8/1996 | Skarbo et al. |
| 5,546,451 A | 8/1996 | Shen |
| 5,550,900 A | 8/1996 | Ensor et al. |
| 5,563,935 A | 10/1996 | Small |
| 5,590,179 A | 12/1996 | Shincovich et al. |
| 5,602,908 A | 2/1997 | Fan |
| 5,604,797 A | 2/1997 | Adcock |
| 5,636,269 A | 6/1997 | Eisdorfar |
| 5,737,400 A | 4/1998 | Bagchi et al. |
| 5,764,748 A | 6/1998 | Rosenthal et al. |
| 5,802,155 A | 9/1998 | Garland et al. |
| 5,812,648 A | 9/1998 | Wanner |
| 5,852,658 A | 12/1998 | Knight et al. |
| 5,867,567 A | 2/1999 | Itoh |
| 5,877,676 A | 3/1999 | Shankarappa |
| 5,930,351 A | 7/1999 | Lappen et al. |
| 5,978,451 A | 11/1999 | Swan |
| 5,999,207 A | 12/1999 | Rodriguez et al. |
| 6,002,763 A | 12/1999 | Lester et al. |
| 6,044,148 A * | 3/2000 | Bleile .................. H04M 1/663 379/372 |
| 6,058,171 A | 5/2000 | Hoopes |
| 6,219,409 B1 | 4/2001 | Smith et al. |
| 6,240,165 B1 | 5/2001 | Yano et al. |
| 6,263,055 B1 | 7/2001 | Garland et al. |
| 6,289,092 B1 | 9/2001 | Nishiara |
| 6,298,122 B1 | 10/2001 | Horne |
| 6,400,814 B1 | 6/2002 | Adams |
| 6,418,330 B1 | 7/2002 | Lee |
| 6,442,249 B1 | 8/2002 | Miller, Jr. |
| 6,442,255 B1 | 8/2002 | Pitch et al. |
| 6,442,256 B1 | 8/2002 | Garland et al. |
| 6,456,696 B1 | 9/2002 | Fargano et al. |
| 6,496,569 B2 | 12/2002 | Pelletier et al. |
| 6,498,841 B2 | 12/2002 | Bull |
| 6,594,354 B1 | 7/2003 | Kelly |
| 6,618,473 B1 | 9/2003 | Davis |
| 6,631,188 B1 | 10/2003 | Sands |
| 6,671,671 B1 | 12/2003 | Garland et al. |
| 6,697,470 B2 | 2/2004 | McDonough |
| 6,700,957 B2 | 3/2004 | Horne |
| 6,714,637 B1 | 3/2004 | Kredo |
| 6,816,582 B2 | 11/2004 | Levine et al. |
| 6,917,680 B1 | 7/2005 | Korn et al. |
| 6,924,747 B2 | 8/2005 | Schlafer |
| 6,941,269 B1 | 9/2005 | Cohen et al. |
| 6,956,943 B1 | 10/2005 | Goodrich, II |
| 6,968,216 B1 | 11/2005 | Chen et al. |
| 7,026,914 B1 | 4/2006 | Amma |
| 7,031,453 B1 | 4/2006 | Busardo |
| 7,062,026 B1 | 6/2006 | Okano |
| 7,113,586 B2 | 9/2006 | Silver |
| 7,133,503 B2 | 11/2006 | Revisky et al. |
| 7,136,475 B1 | 11/2006 | Rogers et al. |
| 7,142,841 B1 | 11/2006 | Almassy |
| 7,239,693 B2 | 7/2007 | Silver |
| 7,352,854 B1 | 4/2008 | Silver |
| 7,443,967 B1 | 10/2008 | Silver |
| 7,486,782 B1 | 2/2009 | Roos |
| 7,526,076 B2 | 4/2009 | Koch |
| 7,529,564 B2 | 5/2009 | Silver |
| 7,660,610 B2 | 2/2010 | Silver |
| 2001/0005681 A1 | 6/2001 | Kim |
| 2001/0010716 A1 | 8/2001 | Smith et al. |
| 2001/0023182 A1 | 9/2001 | Bach et al. |
| 2001/0033643 A1 | 10/2001 | Mulvey et al. |
| 2002/0009184 A1 | 1/2002 | Shnier |
| 2002/0076026 A1 | 6/2002 | Batten |
| 2002/0094067 A1 | 7/2002 | August |
| 2002/0141559 A1 | 10/2002 | Gurgun |
| 2002/0154752 A1 | 10/2002 | Carpenter |
| 2002/0169887 A1 | 11/2002 | MeLampy et al. |
| 2003/0091028 A1 | 5/2003 | Chang et al. |
| 2003/0100261 A1 | 5/2003 | Gusler et al. |
| 2003/0140121 A1 | 7/2003 | Adams |
| 2003/0231749 A1 | 12/2003 | Ansley |
| 2004/0037410 A1 | 2/2004 | Roberts et al. |
| 2004/0067751 A1 | 4/2004 | Vandermeijden et al. |
| 2004/0114749 A1 | 6/2004 | Hayley et al. |
| 2004/0224671 A1 | 11/2004 | Benco |
| 2004/0258215 A1 | 12/2004 | DeVito et al. |
| 2005/0018659 A1 | 1/2005 | Gallant et al. |
| 2005/0038661 A1 | 2/2005 | Momosaki et al. |
| 2005/0058268 A1 | 3/2005 | Koch |
| 2005/0152347 A1 | 7/2005 | Chen et al. |
| 2005/0172309 A1 | 8/2005 | Risan et al. |
| 2006/0025158 A1 | 2/2006 | LeBlanc et al. |
| 2007/0121920 A1 | 5/2007 | Silver |
| 2007/0121921 A1 | 5/2007 | Silver |
| 2007/0154004 A1 | 7/2007 | Daigle |
| 2009/0052652 A1 | 2/2009 | Silver |

* cited by examiner

METHODS, SYSTEMS, AND PRODUCTS FOR SUPPRESSION OF ALERTS

CROSS-REFERENCE TO RELATED APPLICATIONS

This application is a continuation of U.S. application Ser. No. 14/108,433 filed Dec. 17, 2013 and since issued as U.S. Pat. No. 9,137,382, which is a continuation of U.S. application Ser. No. 12/259,545 filed Oct. 28, 2008 and since issued as U.S. Pat. No. 8,619,954, which is a continuation of U.S. application Ser. No. 10/673,949 filed Sep. 29, 2003 and since issued as U.S. Pat. No. 7,443,967, with all applications incorporated herein by reference in their entireties.

BACKGROUND OF THE INVENTION

1. Field of the Invention

This invention relates generally to the field of communications. More particularly, this invention relates to systems and methods for timed ring suppression of communications devices.

2. Description of the Related Art

Telecommunications has experienced explosive growth, and more growth is planned as telecommunication access and numerous communications devices improve. This explosive growth is revolutionizing special services offered to subscribing customers. Of the special service offerings, the most relevant to this invention is the caller identification or Caller ID services. A customer or a user of a telephone that is served by the Caller ID service is provided with a calling party's directory information. Presently available Caller ID systems provide the calling party's telephone number and a billing name associated with the calling party's telephone number (if available) when an incoming caller line identification (ICLID) signal can be detected, decoded, and transmitted to the called telephone or other display device associated with the called telephone (e.g., a Caller ID device). The Caller ID services also allow the customer to receive directory information for other incoming calls while the customer's phone is used (e.g., during a conversation with another party); this service is sometimes referred to as Caller ID Call Waiting service.

A customer may use the displayed Caller ID information to make a decision to answer and/or to prepare for the call. In addition, the customer may use Caller ID information to block incoming calls associated with one or more ICLID signals including specific telephone numbers selected by the customer and/or privacy screening services for unidentifiable telephone numbers of incoming calls (e.g., telemarketers). If the customer wants to selectively answer incoming calls using Caller ID information, the customer has several choices—block the call or ignore the ringing (or other audible alerts) until the call is processed by a voice messaging system (or other call handling system) or until the caller hangs up. If the call is blocked, then the customer may not have immediate notification of the incoming blocked call to re-evaluate whether to accept the call since circumstances for accepting the call may change. If the customer ignores the call and listens to unwanted ringing, then the customer may be annoyed with the repetitive noise alerting the customer of the call. In recent years, telephony providers and manufacturers have tried to provide alternate systems and methods to alert the customer of selective incoming calls that minimizes interruptions for unwanted calls.

For example, U.S. Pat. No. 5,351,289 to Logsdon et al., entitled "Caller ID Telephone Security Device," discloses a caller ID telephone security system. This caller ID telephone security system mutes the ringer of a telephone until the ICLID signal of the incoming call is compared with a list of telephone numbers (or other reference data) to determine whether to activate the ringer and pass the call to the communications device. If the call does not pass through to the communications device, then the call is blocked, the ringer is never activated, and, thus, the customer is not alerted of the incoming call. Further, because this invention requires that the customer to predetermine which calls to pass through and which calls to block, if the customer has not identified a particular telephone number (or other reference data) to pass through or block, then a desired call may be blocked or an unwanted call may ring and pass through.

Another example, U.S. Pat. No. 6,400,814 to Adams, entitled "Telephone with Ringer Silencer Screening Feature," discloses a telephone with a ringer silencer that allows the customer to depress a keypad to deactivate the ringer on a call-by-call basis after activation of the ringer by receipt of the incoming call. That is, the ringer produces an audible alert until the customer is able to depress the keypad. Once the keypad is depressed, the ringer does not produce another audible alert until the next incoming call. Another embodiment discloses a system that either deactivates the ringer or that allows the customer to depress a keypad to transfer the call to a voice messaging system thus terminating the signal to the ringer. Again, the customer may be annoyed with the ringing until the keypad is depressed, and if the customer accidentally depresses the transfer keypad, then the call is routed to voicemail and the customer can not answer the call.

BRIEF SUMMARY OF THE INVENTION

This invention addresses the above and other needs by providing systems and methods for enabling notification of a second incoming communication during timed ring suppression of a first communication. Typically, a customer receives a first incoming call to a communications device and is alerted of the first incoming call with an initial audible alert (e.g., a ring) produced by a ringer (or alternate noise maker) of the communications device. Subsequent rings of the ringer may be suppressed for a selected time period such that one or more rings are silenced during an uninterrupted on-hook state of the telephone. Thereafter, the customer receives a second incoming call to the communications device and is alerted of the second incoming call with either a similar audible alert or a distinctive audible alert produced by a ringer (or alternate noise maker) of the communications device while the notification alert/indicator of the first incoming call is suppressed.

In an embodiment, a communications system for timed ring suppression includes a communications dataserver and a timed ring suppression application. The dataserver communicates with a communications network to detect, decode, communicate, and/or send notification of a second incoming communications signal to a receiving party's communications device while a communications indicator/alert (such as, for example a ringer) is time ring suppressed for a first incoming communications signal. The dataserver stores a timed ring suppression profile (also referred to as timed ring suppression reference data) that includes a parameter associated with an incoming line identification signal of the first incoming communications signal, a timing parameter for suppressing an audible alert (or alternate communications indicator) of the receiving party's communications device after the receiving party's communications device activates the audible alert to produce an initial audible alert of the first incoming communications signal, and a second call during timed ring suppression parameter for activating the audible alert of the receiving party's communications device of the second incoming communications signal while the audible alert of the receiving party's communications device is suppressed for the first incoming communications signal. The timed ring suppression application generates the timed ring suppression signal to activate an audible alert of the second incoming communications signal according to the timed ring suppression profile while the audible alert of the receiving party's communications device is suppressed for the first incoming communications signal. The communications network may include a public switched telephone network, a mobile switching telephone communications network, a satellite communications network, and/or a world wide electronic data communications network having a timed ring suppression interface via at least one of an internet, an intranet, or an extranet. In various embodiments, the timed ring suppression may be controlled by customer premise hardware and equipment including a telephone (or alternate communications device) with a built in (or otherwise integrated) timed ring suppressor and a stand-alone timed ring suppressor coupled with the telephone. In an alternate embodiment, the timed ring suppression may be controlled by a communications network that detects, decodes, and processes timed ring suppression of the incoming communications signals to the receiving party's communications device. Additionally, emergency personnel, authorized calling parties, and other authorized entities (e.g., a technician of the communications network) may override the timed ring suppression to continuously audibly alert the customer (or another receiving party) of the incoming communications signal.

Another embodiment discloses a timed ring suppressor system that includes a first switch communicating with a first calling party's communications device, a second switch communicating with a second calling party's communications device, a third switch communicating with a receiving party's communications device, and a communications network coupling one or more of the switches. The communications network processes an incoming line identification (ICLID) signal of a first incoming communications signal associated with the first calling party's communications device to generate a timed ring suppression signal and transmits the first incoming communications signal and the timed ring suppression signal to the third switch. The third switch processes the timed ring suppression signal to suppress a ringer of the receiving party's communications device after the receiving party's communications device activates the ringer to produce an initial audible alert of the first incoming communications signal such that subsequent audible alerts of the first incoming communications signal are suppressed according to a timing parameter. Thereafter, the communications network processes an ICLID signal of a second communications signal associated with the second calling party's communications device and supplants the timed ring suppression signal associated with the ICLID signal of the first incoming communication such that the second incoming communication signal and the supplanted timed ring suppression signal are communicated with the third switch. Then, the third switch processes the supplanted timed ring suppression signal to activate the ringer of the receiving party's communications device to produce an audible alert of the second incoming communications signal while the audible alert is suppressed for the first incoming communications signal.

Another embodiment discloses a timed ring suppression system that includes a telecommunications server for processing a first incoming communication to a called telephone number, a timed ring suppression signal associated with the called telephone number and an ICLID signal of the first incoming communication, a second incoming communication to the called telephone number, and a supplanted timed ring suppression signal associated with the ICLID signal of the second incoming communication and/or the timed ring suppression signal. The timed ring suppression signal for suppressing a ringer of the receiving party's communications device after the receiving party's communications device activates the ringer to produce an initial audible alert of the telephone call such that subsequent audible alerts are suppressed according to a timing parameter, and the supplanted timed ring suppression signal for activating the ringer of the receiving party's communications device to produce an audible alert of the second incoming communication while the audible alert of the first incoming communication is suppressed.

Other embodiments disclose methods for timed ring suppression. According to an embodiment, a method for timed ring suppression includes (1) processing a first incoming communications signal from a first calling party's communications device to a receiving party's communications device, (2) associating an incoming line identification (ICLID) signal with the first incoming communications signal, (3) associating a timed ring suppression profile with the ICLID signal of the first incoming communications signal, (4) generating a timed ring suppression signal, (5) processing a second incoming communications signal from a second calling party's communications device to the receiving party's communications device, (6) associating an incoming line identification (ICLID) signal with the second incoming communications signal, (7) associating the timed ring suppression profile with the ICLID signal of the second communications signal, and (8) generating a supplanted timed ring suppression signal. The supplanted timed ring suppression profile includes an identifier of the calling party, a communications address associated with the calling party's communications device, an identifier of the calling party's communications device, and/or an alert preference for notifying the receiving party's communications device of the second incoming communications signal while the ringer is suppressed according to the timing parameter for notification of the first incoming communications signal. Further, the supplanted timed ring suppression signal activates an audible alert of the second incoming communications signal while the audible alert is suppressed according to the timing parameter for notification of the first incoming communications signal.

Further details on these embodiments and other possible embodiments including methods of timed ring suppression are set forth below. As is appreciated by those of ordinary skill in the art, this invention has wide utility in a number of areas as illustrated by the discussion below. These embodiments may be accomplished singularly, or in combination, in one or more of the implementations of this invention.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
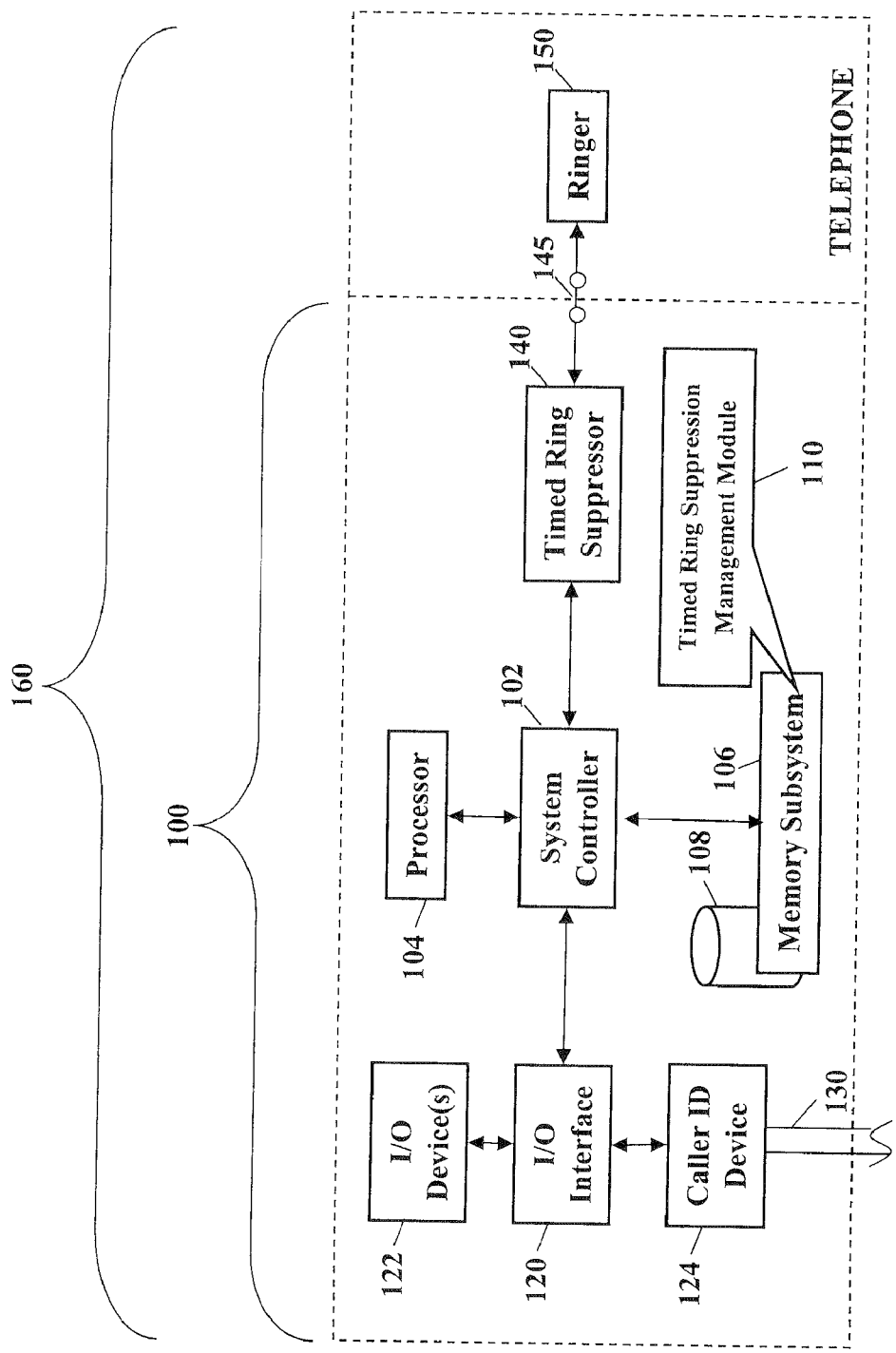
FIG. 1 is a block diagram of a timed ring suppressor device according to embodiments of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The timed ring suppression systems and methods of this invention operate with different communications devices and communications networks to enable, disable and/or otherwise control secondary incoming communications during timed ring suppression of a first incoming communication. The timed ring suppressor leverages the assets of the connected communications device(s) and/or communications networks in terms optimally using the connected software, hardware, equipment, networks, and/or other information technology assets. For example, a customer's communications device may have a local and/or a wide area network that utilizes Ethernet, dedicated private lines, Frame Relay, ISDN, ATM, ADSL, and the like to provide a high speed connection to a data network, such as the Internet, Intranet, and/or Extranet. Typically, the customer receives a first incoming call to a communications device and is alerted of the first incoming call with an initial audible alert (e.g., a ring) produced by a ringer (or alternate noise maker) of the communications device. Subsequent rings of the ringer may be suppressed for a selected time period such that one or more rings are silenced during an uninterrupted on-hook state of the telephone. Thereafter, the customer receives a second incoming call to the communications device and is alerted of the second incoming call with either a similar audible alert or a distinctive audible alert produced by a ringer (or alternate noise maker) of the communications device while the notification alert/indicator of the first incoming call is suppressed. The timed ring suppression may be controlled by customer premise hardware and equipment including a telephone (or alternate communications device) with a built in (or otherwise integrated) timed ring suppressor and/or a stand-alone timed ring suppressor coupled with the telephone. In an alternate embodiment, the timed ring suppression may be controlled by a communications network that detects, decodes, and processes timed ring suppression of the incoming call to the communications device. Additionally, emergency personnel, authorized calling parties, and other authorized entities (e.g., a technician of the communications network) may override the timed ring suppression to continuously audibly alert the customer (or another receiving party) of the incoming call.

As used herein, the term "communications device" includes wired and wireless communications devices, such as a plain old telephone (POTS phone), a mobile phone, a wireless phone, a WAP phone, a satellite phone, a computer, a modem, a pager, a digital music device (e.g., MP3/4 player), a digital recording device, a personal digital assistant, an interactive television, a digital signal processor, and a Global Positioning System device. Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with the receiving party, and/or (4) timed ring suppression profiles, including configuration, authenticity, security, and other data. In various embodiments, the data may be stored by the communications network, a peripheral storage device connected to the communications network, the timed ring suppressor device, the communications device, and/or other connected networks.

Referring now to the figures, FIG. 1 is a block diagram showing a timed ring suppressor device 100 coupled with a telephone 160. The timed ring suppressor device includes a system controller 102, a processor 104, a memory subsystem 106, a database 108, a timed ring suppression management module (also referred to as the "timed ring suppression program") 110, an input/output ("I/O") interface 120, one or more input/output device(s) 122, a caller identification device 124, a telephone line connection (or connection to an alternate communications device) 130, a timed ring suppressor 140, and a circuit 145 that connects the timed ring suppressor with a ringer 150 of the telephone 160. The system controller 102, as known in the art, provides a bridging function between the processor 104, the memory subsystem 106, the input/output interface 120, and the timed ring suppressor 140. Typically, as known in the art, a system bus communicates signals, such as data signals, control signals, and address signals, between the processor 104 and the system controller 102. The processor 104 executes an operating system that controls the internal functions of the timed ring suppressor device 100. The timed ring suppression program 110 operates within the system memory 106; however, the timed ring suppression program 110 could also reside in flash memory or a peripheral storage device. The I/O Interface 120 allows the timed ring suppressor device 100 to monitor, detect, receive, and decode an incoming call identification (ICLID) signal of an incoming call via the Caller ID device 124 coupled with line 130. Alternatively, the timed ring suppressor device 100 may receive the ICLID signal from a peripheral device (not shown) or via telephone 160. The timed ring suppression program 110 compares reference data transmitted with the ICLID signal to data stored in one of more timed ring suppression profiles stored in memory 106 to activate the timed ring suppressor 140 and enable the circuit 145 to suppress the ringer 150 of telephone 160. A timing parameter of the timed ring suppression profile specifies the time period to silence the ringer and, if applicable, to enable subsequent ringing after the time period has passed. The timing parameter is preferably about six seconds to correspond with a ring cycle. The timing parameter could also be multiples of six second increments to correspond with subsequent ring cycles. The timing parameter, however, could alternatively be any duration from less than one second to not exceeding about two minutes.

Figure 2:
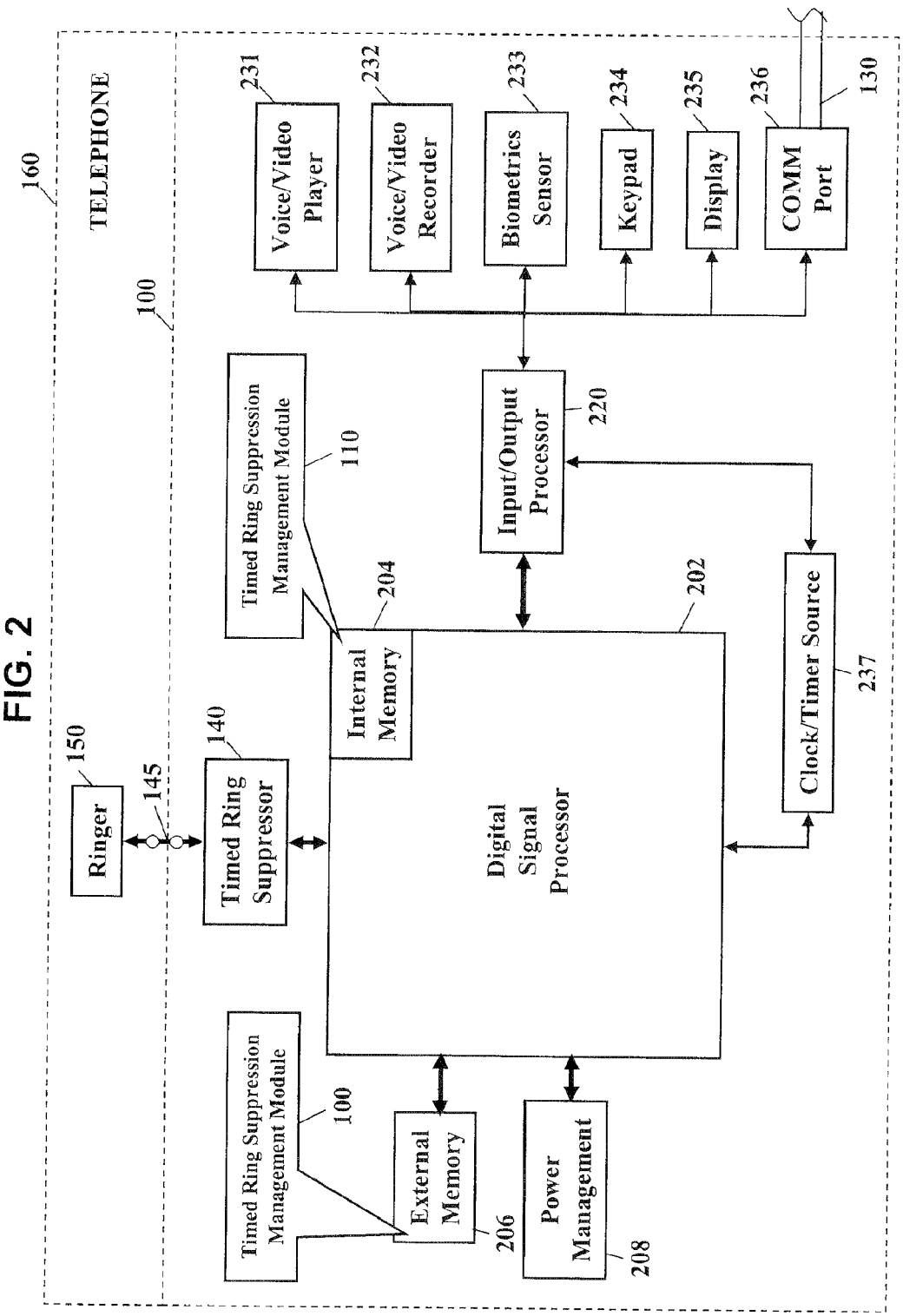
FIG. 2 is a block diagram of a timed ring suppressor device according to embodiments of this invention.

FIG. 2 is a similar block diagram of the timed ring suppressor 100 of FIG. 1; however, the timed ring suppressor of FIG. 2 includes a digital signal processor 202, an internal memory system 204, an external (or peripheral) memory system 206, a power management system 208, an input/output processor 220 interfacing with a voice/video player 231, a voice/video recorder 232, a biometrics sensor 233, a keypad 234, a display 235, a communications ("comm.") port 236, the timed ring suppression program 110, the telephone line connection 130, the timed ring suppressor 140, and the circuit 145 that connects the timed ring suppressor 140 with the ringer 150 of the telephone 160. The timed ring suppression program 110 operates within a memory device of the digital signal processor 202. The memory device could include the internal memory 204 of the digital signal processor 202, or the memory device could include the external memory device 206 communicating with the digital signal processor 202. The digital signal processor 202 converts analog signals to digital signals and converts digital signals to analog signals. The digital signal processor 202 could include compression and decompression algorithms, cancellation algorithms, audio-processing circuitry, filter circuitry, and amplifier circuitry. Although digital signal processors can be designed to provide differing capabilities and a variety of performance criteria, the basic functions of the digital signal processor are known and, thus, will not be further discussed.

The digital signal processor 202 interfaces with an input/output processor 220. The input/output processor 220 controls system input/output and provides telephony-like control features. A bus provides a signal communication path between the digital signal processor 202 and the input/output processor 220. The input/output processor 220 is a microprocessor that includes memory (not shown), communication controllers (not shown), and peripheral controllers (not shown). The communication controllers, for example, could control packet-based communications with a data network (shown as reference numeral 860 in FIG. 8-10) through the COMM port 236. The communication controllers could also control packet-based communications with a telecommunications switch (shown as reference numeral 610 in FIGS. 6, 8-10) through the COMM port 236. The clock source 237 provides a system clock for the timed ring suppressor device 100, and the clock source 237 may also include higher and lower frequency multiples of the system clock depending upon power requirements and power availability. The power management system 208 provides differing power control mechanisms, such as a sleep mode and a low-power mode, to efficiently utilize available power and to reduce thermal management concerns. Further, the power management system may include a power source, such as a rechargeable battery to provide power and allow the timed ring suppression device 100 to be portable.

The peripheral controllers of the input/output processor 220 provide an interface with the attached peripherals including, for example, the voice/video player 231, voice/video recorder 232, the biometrics sensor 233, the display 235 (such as an LCD/LED/CRT display), the keypad 234, and the COMM port 130. The timed ring suppression program 110 may cooperate with the operating system and with the peripherals (e.g., display 235 and keypad 234) to provide a graphical user interface (GUI) for the timed ring suppression program 110. The GUI provides a convenient visual and/or audible interface with the user of the time ring suppression device 100. As is apparent to those of ordinary skill in the art, the user (e.g., the customer) interacts with the timed ring suppression program 110 over a variety of mediums, such as, for example, a stylus (shown as reference numeral 355 in FIG. 3), keyboard (shown as reference numeral 350 in FIG. 3), and punch buttons (shown as reference numerals 330, 335, 340, 342, 344, 346, 348, and 349 of FIG. 3) of the keyboard system, a display screen (shown as reference numeral 300 of FIG. 3) of the graphics subsystem, and/or a voice-activated menu prompt (shown as punch button 342 and speaker 360 in FIG. 3) of the audio subsystem. Additionally, the peripheral bus controller provides an interface with the biometrics sensor 233, such as, for example, a fingerprint ID device. The biometrics sensor 233 may provide security features that prevent unauthorized users from exploiting the timed ring suppression device 100. The biometrics sensor 233 could also comprise retina recognition device and software, DNA/RNA recognition device and software, facial recognition device and software, speech recognition device and software, and/or scent recognition device and software.

The timed ring suppressor device 100 enables the circuit 145 to suppress the ringer 150 of telephone 160. If, for example, the timed ring suppressor device 100 communicates with the telecommunications switch (shown as reference numeral 610 in FIGS. 6, 8-10), the COMM port 236 receives the incoming line identification (ICLID) signal transmitted via phone line 130 with an incoming call. The ICLID signal includes telephone network information provided by a telecommunications provider. When the ICLID signal is received, the digital signal processor 202 interfaces with the timed ring suppression program 110 and with the internal memory device 204 and/or the external memory device 206 to associate a timed ring suppression profile that matches reference data of the ICLID signal (e.g., a matching telephone number). The timed ring suppression program 110 includes the timing parameter for suppressing subsequent rings of the ringer 150 after the ringer 150 produces an initial audible alert (e.g., a ring) of the incoming call. Thus, the customer (or another receiving party) is always provided an initial audible alert of the incoming call. Once the timed ring suppression profile is associated, the digital signal processor 202 and the clock source 237 operate with the timed ring suppressor 140 to suppress subsequent rings of the ringer 150 according to the timing parameter. Alternatively, the timed ring suppressor may be manually activated by a punch button (such as reference numeral 348 in FIG. 3) to suppress one or more subsequent rings of the ringer 150.

The timed ring suppression program 110 may be physically embodied and/or otherwise stored on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-customers, licensees, and assignees. These types of computer-readable media, and other types not mention here but considered within the scope of this invention, allow the timed ring suppression program 110 to be easily disseminated.

The processor (such as reference numerals 104 of FIG. 1 and 204 of FIG. 2) is typically a microprocessor. Advanced Micro Devices, Inc., for example, manufactures a full line of microprocessors, such as the ATHLON™ (ATHLON™ is a trademark of Advanced Micro Devices, Inc., one AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Bambi, I removed the "hyperlinks" from this paragraph. I also noticed differing font sizes throughout the document, so I globally changed the font to 12.

Figure 3:
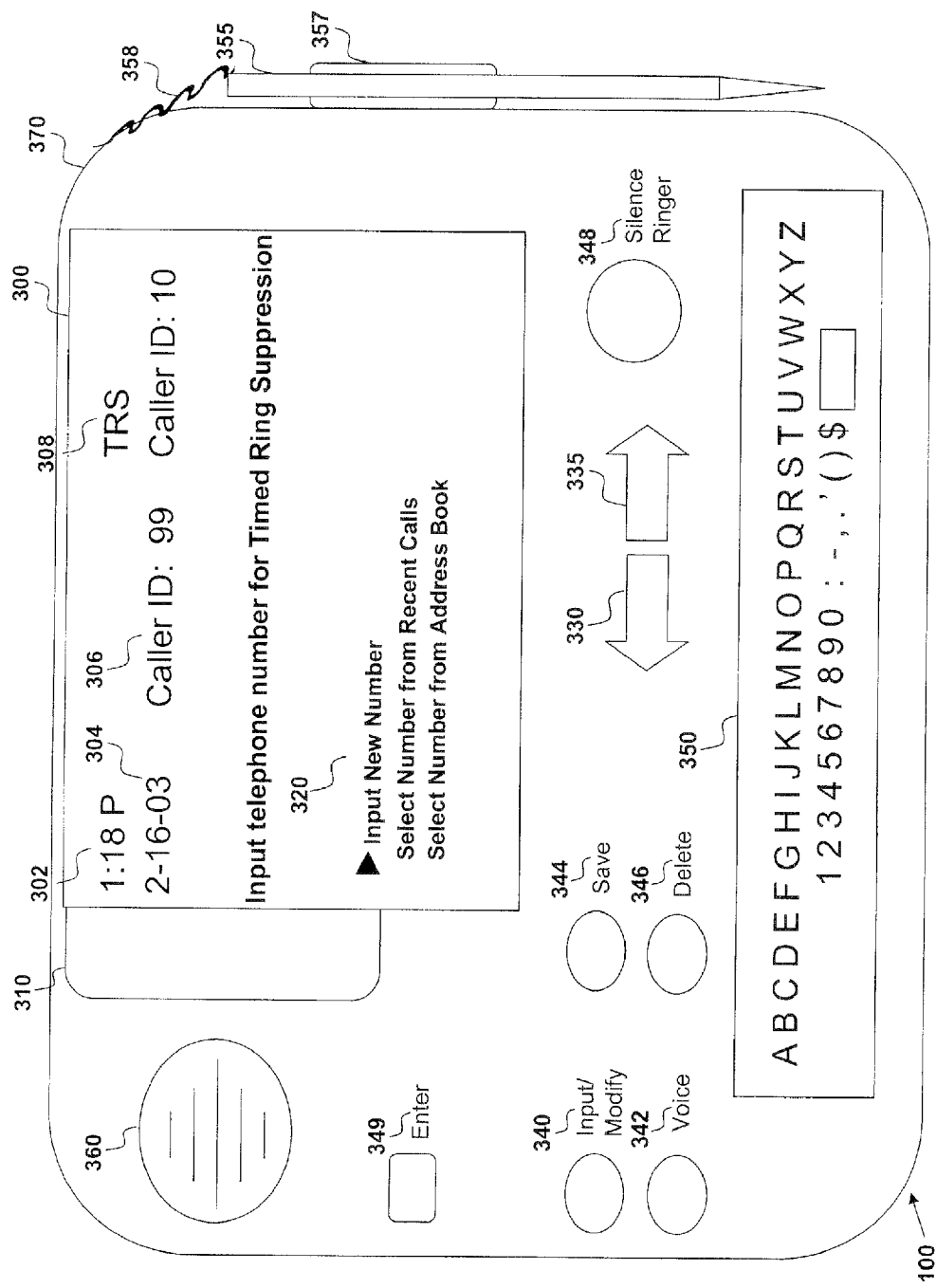
FIG. 3 is perspective front view of the timed ring suppressor device of FIG. 2 including a screen display for inputting a communications address for timed ring suppression according to embodiments of this invention.

Referring now to FIG. 3, a perspective front view of the timed ring suppression device 100 of FIG. 2 includes a display screen 300 having displays for a time 302, a date 304, a numeric identifier 306 of an incoming Caller ID (e.g., ICLID signal) with an incoming call, a numeric identifier 308 of a matched timed ring suppression (TRS) Caller ID (i.e., reference data matched from the ICLID signal with data stored in a timed ring suppression profile), and a graphical user interface 320 for accessing, inputting, modifying, and/or otherwise managing a timed ring suppression profile. The timed ring suppression device 100 also includes a lighted display panel 310 that flashes to produce a visual alert of an incoming, timed ring suppressed call in an uninterrupted on-hook state (e.g., an incoming call that has activated at least one ring of the ringer and subsequently had the ringer silenced by the timed ring suppression device 100 such that the call is in an uninterrupted on-hook state). Because the panel would alert the customer of the incoming, time ring suppressed call, the customer (and/or other person wanting to answer the call) would know that the call is still available to answer even though the ringing is suppressed. Thus, the customer would know that if they took the phone off-hook (e.g., to answer the call or to place an outgoing call) then the incoming call would be connected. The lighted display panel 310 may be part of graphics subsystem 230 or may be an isolated component. The lighted display panel 310, for example, could be remotely located on a wall, ceiling, or table to provide the visual alert. The lighted display panel 310 could operate via wireless communication (e.g., infrared and/or the I.E.E.E. 802 standards) with the timed ring suppression device 100. The lighted display panel 310 could also operate via a wired connection. The keyboard system 232 includes punch buttons 330, 335, 340, 342, 344, 346, 348, 349, keyboard 350, and stylus 355. The stylus 355 is connected by a cord 358 or other appropriate connection assembly (not shown) to a housing 370 of the timed ring suppression device 100 and positioned in a storage holder 357 when not in use. The stylus 355 may be used to interact with the keyboard 350 and/or with the display 300 to access, select, modify, and/or otherwise manage one or more timed ring suppression profiles. Alternatively, the user could use his/her fingers or other pointed device to select each character from the keyboard 350. With regards to the punch buttons, they provide a convenient interface for quickly and conveniently interacting with the timed ring suppression device 100. For example, the user may punch or press (1) a left arrow key 330 to scroll through recent outgoing calls (e.g., calls dialed from the communications device 150) or recent incoming call to select a new telephone number to add to a timed ring suppression profile, go back a step when interacting with the timed ring suppression program 110, and/or for other interactions with the timed ring suppression program 110, (2) a right arrow key 335 to scroll forwards through recent outgoing calls or recent incoming call and for other interactions with the timed ring suppression program 110, (3) a "Input/Modify" button 340 to initiate composing or editing one or more timed ring suppression profiles, (4) a "Voice" button 342 to record a voice or other audio message (in different embodiments, the audio message may be converted from a speech-to-text message to compose and/or modify one or more timed ring suppression profiles and/or to convert a text timed ring suppression profile (or a telephone number of the ICLID signal) from text-to-speech (such as with visually impaired customers), (5) a "Save" 344 button to store one or more timed ring suppression profiles, (6) a "Delete" button 346 to erase one or more timed ring suppression profiles, (6) a "Silence Ringer" button 348 to manually activate timed ring suppression of the ringer (such as when the incoming call is not associated with the timed ring suppression profile to automatically enable timed ring suppression), and (7) an "Enter" button 349 to enter and/or confirm selection of information displayed on the display screen 300. Further, the "Voice" button 342 interfaces with a speaker/recorder 360 of the audio system to audibly present and/or record data of the timed ring suppression profile and to interact with the timed ring suppression program 110 to administer and otherwise manage the timed ring suppression device 100.

Typically, the customer creates, modifies, and/or otherwise manages one or more timed ring suppression profiles by punching or pressing the "Input/Modify" button 340 that brings up an interactive "Input Telephone Number for Timed Ring Suppression" GUI (similar to GUI 320). The customer may then select to (1) input a new address (e.g., telephone number) or (2) access a timed ring suppression caller identification organizer that stores and sorts data by (i) a telephone number associated with the incoming line identification signal, (ii) an outgoing telephone number dialed from the communications device, and/or (iii) a name associated with a telephone number, an outgoing telephone number, and/or a caller control signal. After the communications address is input, the customer presses the "Enter" button 349 to enter the communications address. After the address(es) is/are entered, the customer may be prompted by another GUI (not shown) to associate the address with a name and/or with a communications device so that when a call is received from that number and matched with the timed ring suppression profile, the display 300 provides the telephone number, name, communications device, and/or information such as a date/time of the incoming call, a geographic location identifier of the call, a calling party control/password to override timed ring suppression, and other information associated with the incoming call. Still further, the customer may be prompted by another GUI (not shown) to select a timing parameter that defines the time period for silencing an incoming call from a particular communications address. The timing parameter may also specify a time period to re-activate the ringer. For example, the customer may select to suppress a call from his/her mother after the initial ring for 18 seconds, and thereafter, to reactivate the ringer. That way the customer knows that his mother's incoming call is still available to answer, and she has not terminated the call (and, thus infer that the call might be important enough to answer). Another example may be to suppress a call from unknown or blocked numbers indefinitely, that is, after the first ring, all subsequent rings of the incoming call having the unknown or blocked number are suppressed until the call is terminated and/or otherwise handled (e.g., answered by voice messaging system).

Figure 4:
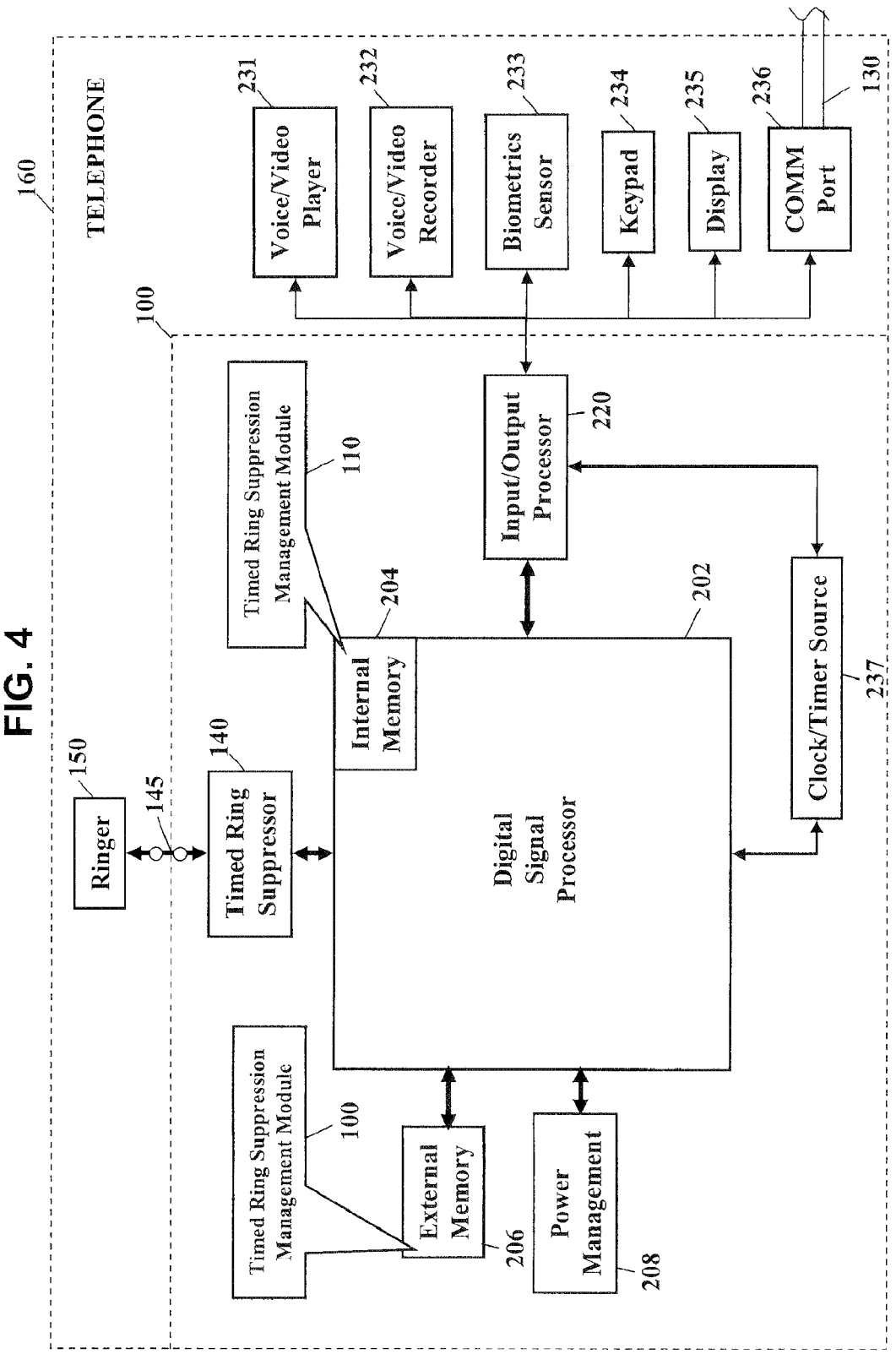
FIG. 4 is a block diagram of a timed ring suppressor device according to embodiments of this invention.

FIG. 4 is a similar block diagram of the timed ring suppressor 100 of FIG. 2; however, the timed ring suppressor 100 of FIG. 4 includes the telephone 160 that houses the voice/video player 231, the voice/video recorder 232, the biometrics sensor 233, the keypad 234, the display, and the communications ("comm.") port. That is, these components are integral to telephone 160, and, thus are not integrated into the peripheral timed ring suppression device 100 shown in FIG. 3. For example, a keypad of a telephone (not shown) may be used instead of the keypad 350, punch buttons (330, 335, 340, 342, 344, 346, 348, and 349), and stylus 355 of FIG. 2.

Figure 5:
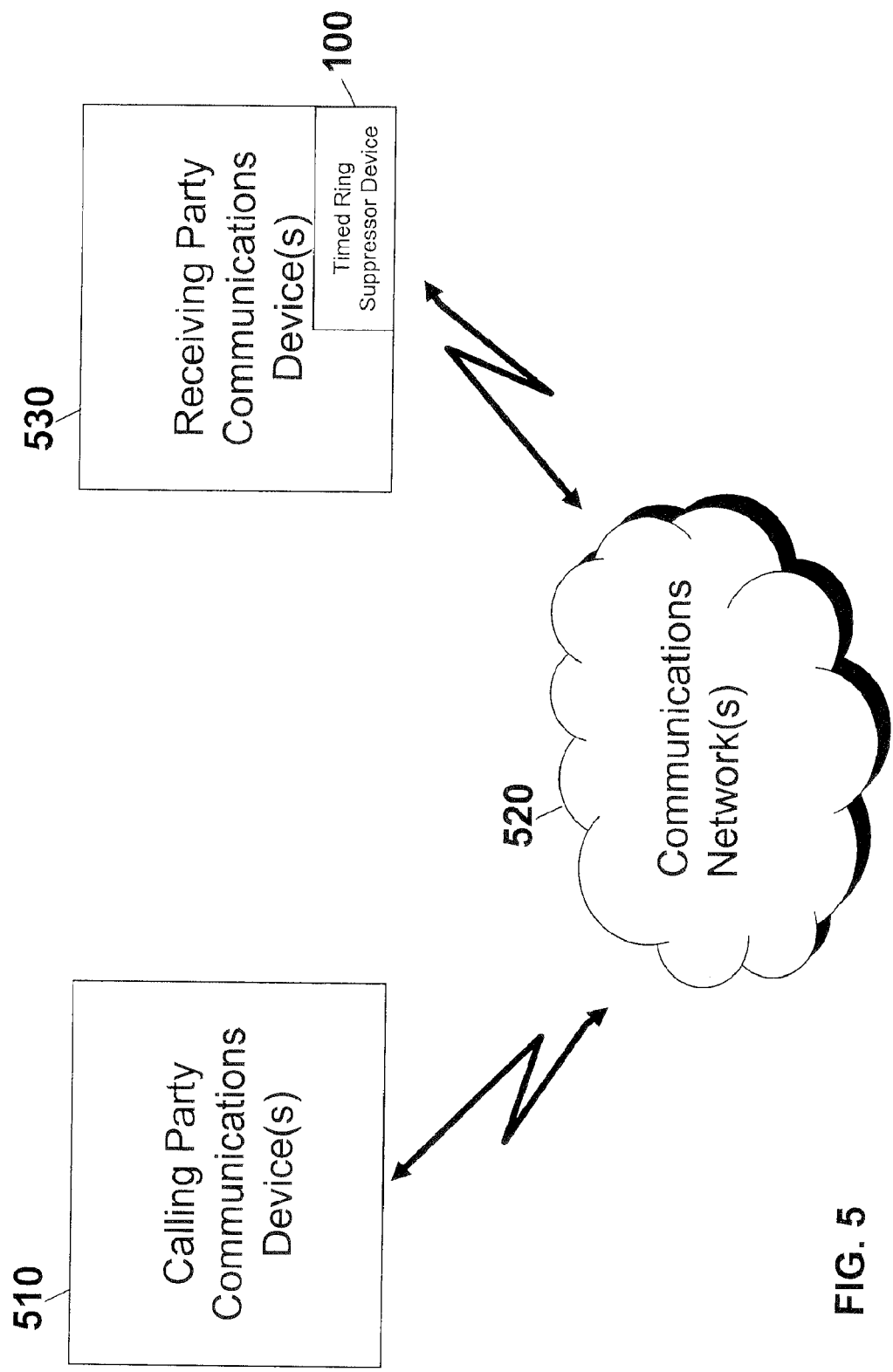
FIG. 5 is a schematic of a timed ring suppression system illustrating a communications network connecting a calling party's communications device with a receiving party's communications device and a timed ring suppressor device according to embodiments of this invention.
Figure 6:
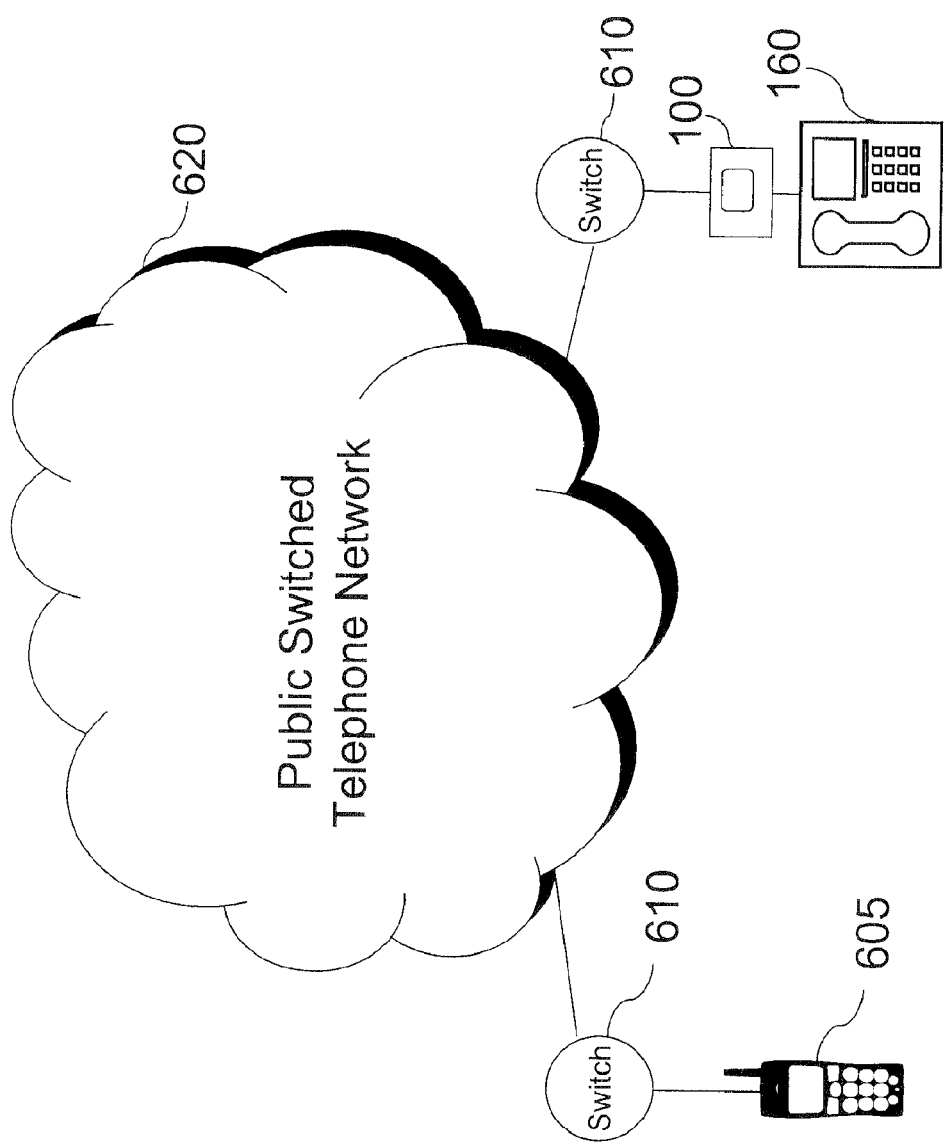
FIG. 6 is a schematic of a timed ring suppression system illustrating a public switched telephone network connecting a calling party's telephone with a customer's telephone and a timed ring suppressor device according to embodiments of this invention.

FIG. 5 illustrates a timed ring suppression communications system including a calling party's communications device 510, at least one communications network 520, and a receiving party's (e.g., the customer's) communications device 530 having or coupled with the timed ring suppression device 100. The calling party uses communications device 510 to place a call (or other communication) over communications network 520 to the receiving party's communications device 530. A ringer (or other noise making device) of the communications device 530 produces an initial audible alert (e.g., one ring) and an incoming line identification (ICLID) signal associated with the incoming call is detected, decoded, and compared with one or more timed ring suppression profiles by the timed ring suppression device 100. If reference data of the ICLID signal matches a timed ring suppression profile, then the timed ring suppression profile specifies a timing parameter (or uses a default timing parameter) to silence subsequent rings of the ringer for the incoming call. As discussed above, the timed ring suppression profile includes data for communications addresses (incoming and outgoing calls), names and/or other identifiers of a caller, time, date, geographic and/or other network identification information associated with the ICLID signal, identification of the caller's communications device (e.g., cellular phone, satellite phone, etc.), the timing parameter to suppress ringing, and/or caller control override features. FIG. 6 is similar to FIG. 5; however, the calling party's communications device is a wireless communications device, such as a cellular phone 605. The call from cellular phone 605 is transmitted to an antenna (not shown), then coupled to a mobile switch (also not shown), and then routed via switch 610 into the Public Switched Telephone Network (PSTN) 620. The PSTN 620 decodes and associates the ICLID signal with the call, and, then routes the call with the ICLID signal to the destination address (e.g., the customer's telephone number) via switch 610 and the incoming call and ICLID signal are transmitted to the timed ring suppression device 100 and telephone 160.

Figure 7:
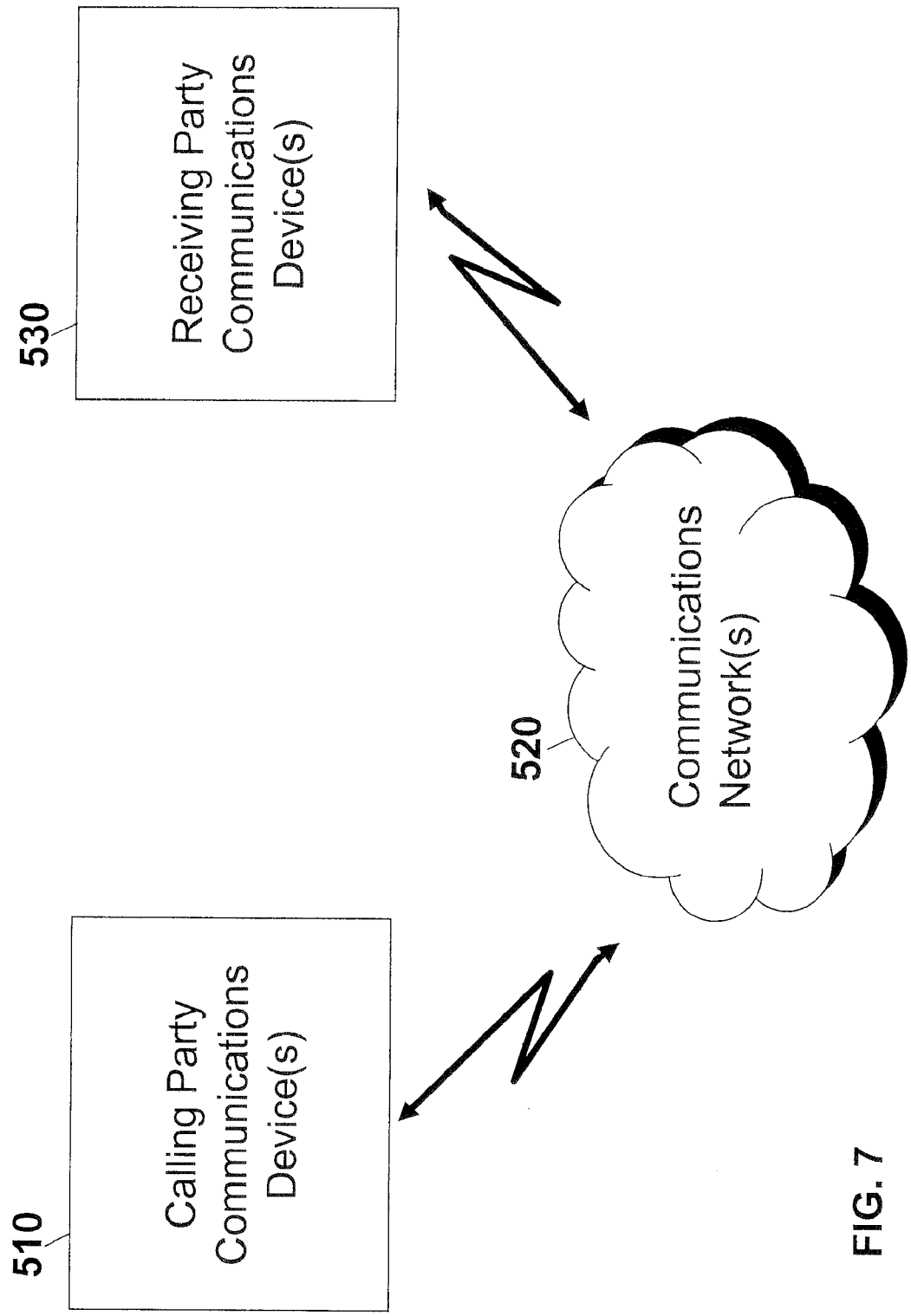
FIG. 7 is a schematic of a timed ring suppression system illustrating a communications network connecting a calling party's communications device with a receiving party's communications device according to embodiments of this invention.

FIG. 7 illustrates another timed ring suppression communications system that includes the calling party's communications device 510 and the receiving party's device 530 communicating with the communications network 520. Neither the calling party's communications device 510 nor the receiving party's communications device 530 integrate and/or are coupled with the timed ring suppression device. Rather, the receiving party (e.g., customer and/or user) makes use of an access number, web page, and/or other medium of the telecommunications network to access, create, modify, and/or otherwise manage one or more timed ring suppression profiles and timed ring suppression services. For example, if the customer calls an access number, the customer is prompted for authorization and/or identification (e.g., a pin number associated with a billing number, password, and/or other verification information), and thereafter, an interactive voice-activated menu may present options for the customer to select in order to access stored timed ring suppression profiles, compose and/or generate a new timed ring suppression profile including inputting one or more communications addresses, names, timing parameters, and/or other data. The telecommunications network 520 stores the timed ring suppression profile and/or other preferences for timed ring suppression of the customer.

Moreover, the timed ring suppression menu presented by telecommunications network 520 may be programmed over a variety of mediums, such as, for example, a voice-activated and/or Dual Tone Multi-Frequency (DTMF) menu prompt. The customer, for example, might select to access stored timed ring suppression profiles by entering a "1" on a touch-tone keypad or by speaking into a receiving audio subsystem and stating the word "one." This entry would then prompt the customer through choices such as accessing recently sent and/or recently received calls, alphanumeric listings of names for the calling party, and so on. After making a selection, the telecommunications network 520 retrieves the stored timed ring suppression profile from a database (such as reference numeral 845 of FIG. 8). In addition, the customer might enter a code (e.g., "*99") in order to automatically activate timed ring suppression for all incoming calls. Similarly the customer could unblock timed ring suppression by entering another code.

Figure 8:
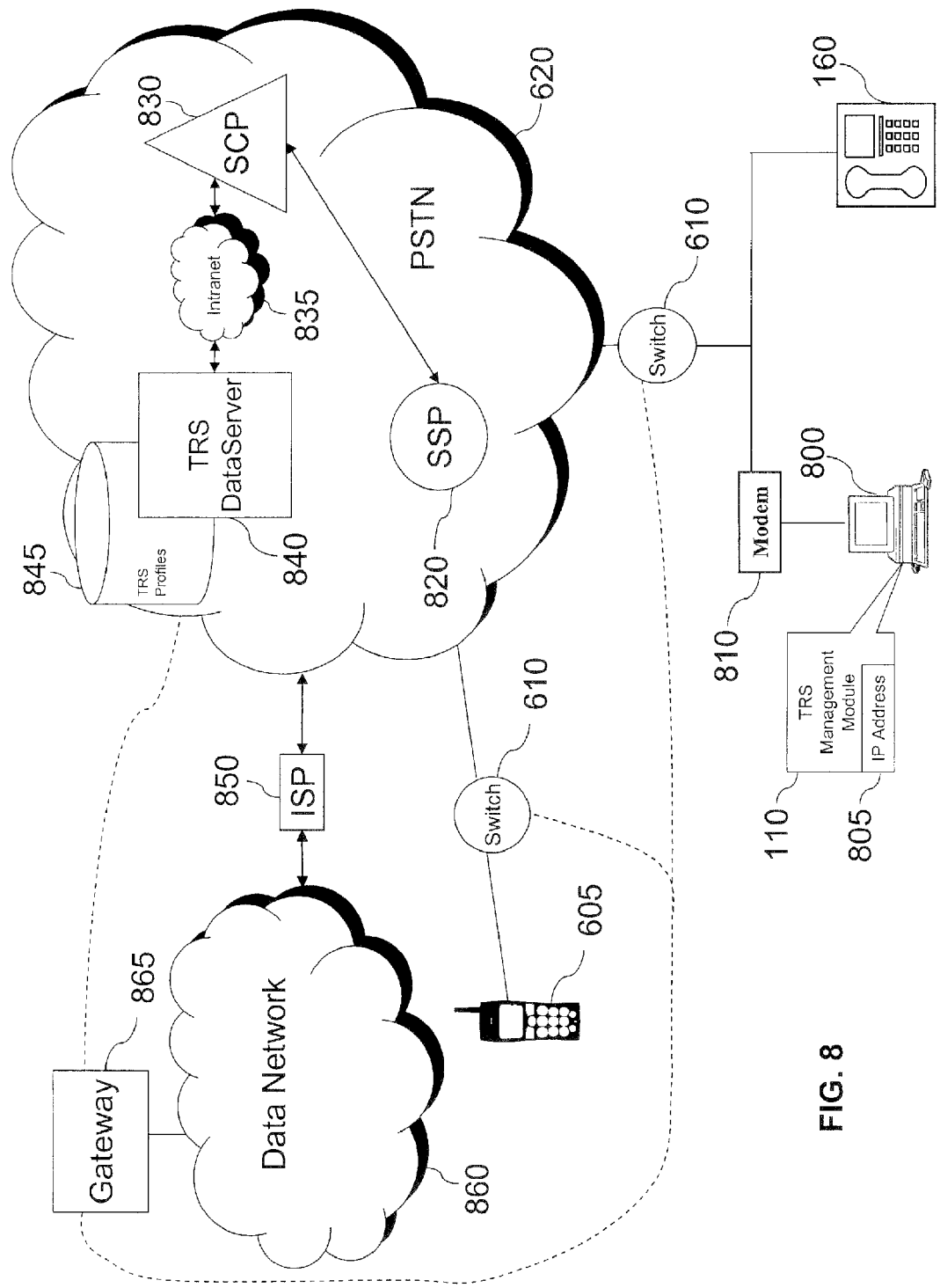
FIG. 8 is a schematic of a timed ring suppression system illustrating the communications connections of a calling party's telephone, one or more communications networks, a customer's telephone, and a customer's computer according to embodiments of this invention.

FIG. 8 shows a more detailed timed ring suppression communications system that makes use of the communications network to enable, disable, and/or otherwise manage timed ring suppression similar to the communications system shown in FIG. 7. The timed ring suppression communications system of FIG. 8 includes the calling party's communications device 605 (shown as a cellular telephone), the communications switch 610 connected to the PSTN 620 that includes a service switching point (SSP) 820, a service control point (SCP) 830, an Intranet 835 (for the telecommunications provider to administer and program the telecommunications network components or for the customer to access and program timed ring suppression services), a timed ring suppression (TRS) Dataserver 840, a database of one or more timed ring suppression profiles 845, an Internet Service Provider (e.g., BellSouth Internet Services) 850, a data network 860, a gateway 865, a destination communications switch 610, and one or more receiving party's communications device(s) shown as telephone 160 capable of communications with the telecommunications network and as modem 810 and personal computer 800 having the timed ring suppression program 110 (referred to as the "Timed Ring Suppression Management Module" in FIG. 8) and an Internet Protocol address 805 to enable communications with the data network 860. Each switch 610 enables the connected communications devices 130, 160, 605, 810, and 800 to communicate electronic communication signals via the data network 860 (e.g., world wide electronic data network such as an Internet, an Intranet, and/or an Extranet) and/or the telecommunications network 620 (e.g., a central office (CO), a mobile telephone switching office (MTSO), and/or a combination CO/MTSO). The telecommunications network 620 may use any means of coupling one of the switches 610 to the telecommunications network 620, but the coupling means is preferably high-capacity, high-bandwidth optical transport services, Gigabit Ethernet services, and/or the like. As those of ordinary skill in the art of telecommunications understand, the telecommunications network 620 could also link each of the switches 610 via other appropriate means, such as, for example a Synchronous Optical Network (SONET) structure with redundant, multiple rings.

The customer may use the TRS Management Module (also referred to as the timed ring suppression program) 110 running on personal computer 800 with Intranet 835 to access and login to the TRS DataServer 840 to establish a timed ring suppression profile in the database 845. Alternatively, an administrator of the telecommunications network 620 could similarly use another personal computer (not shown) and/or alternate workstation (not shown) networked with the Intranet 835 to access, add, delete, store, modify, and manage the database 845 of one or more timed ring suppression profiles. The timed ring suppression profiles control access, sharing, notification, routing, security, transactions, troubleshooting, management, and/or additional processing of timed ring suppression profiles exchanged to/from one or more communications networks customers, users, and non-customers. More specifically, the timed ring suppression profiles establish preferences for enabling timed ring suppression including (1) archiving the timed ring suppression profile to a storage device associated with the telecommunications service provider (so that a database of timed ring suppression profiles including one or more timed ring suppression profiles and/or associated communications addresses are stored), (2) encrypting the timed ring suppression profile (or a portion of the timed ring suppression profile) so that only the receiving party's communications device can enable timed ring suppression, (3) copying the timed ring suppression profile (e.g., copying the timed ring suppression profile from/to the timed ring suppression device 100 of FIG. 2 to the telecommunications network 620), and (4) associating the timed ring suppression profile with a variety of fields, files, and/or other data for Timed Ring Suppression Services, such as, for example login information associated with the customer, user, and/or administrator, password, telephone number(s) or Service Node(s) of the customer (this may include a plurality of addresses that are associated with a Service Node or other switch serving the receiving party's communications device), TCP/IP address of the customer, email address of the customer, profile of the calling party's communications device associated with the matched timed ring suppression profile (e.g., presentation formats of various communications devices), a time or date identifier (e.g., day of week or calendar date), other information associated with the incoming line identification (ICLID) communications signal, display and/or presentation data associated with a GUI (e.g., color, font, placement on screen, etc.), telecommunications network defaults, and timed ring suppression defaults. Typically, the Timed Ring Suppression Profile includes data for (1) the identifier of the calling party (e.g., a name of the calling party), (2) the identifier of the incoming communications address (e.g., a phone number of the calling party's telephone), (3) the time of the incoming call, (4) the date of the incoming call, (5) the geographic region associated with the incoming call, (6) caller control features to disable timed ring suppression, (7) the identifier of the calling party's communications device, (8) other ICLID information, (9) the timing parameter to suppress ringing, (10) other parameters that enable selective timed ring suppression including times of day and days of week, (11) formatting and configuration parameters to enable timed ring suppression for various communications devices, and (12) second call during timed ring suppression parameters to control notification alerts of secondary incoming communications during timed ring suppression. The data of the Timed Ring Suppression Services provide instructions for (1) billing, (2) identification and authentication parameters, (3) parameters to enable and to bypass the disable parameters, (4) memory services for stored timed ring suppression profile data, and/or (5) configuration and formatting preferences for each calling party's communications device communicating with each communications network. In addition, the data for the Timed Ring Suppression Services may include instructions for troubleshooting problems including error messages. Thus, TRS DataServer 840 functions as a computer server, database, and processor that is dedicated to managing timed ring suppression over other connected networks (e.g., data network 860) to the receiving party's communications device.

The telecommunications network 620 may include wired, optical, and/or wireless elements and may further include private network elements, such as private branch exchanges (PBXs), and/or other elements (not shown). The telecommunications network 620 includes Advanced Intelligent Network (AIN) componentry controlling many features of the network. The telecommunications network 620 and/or each of the switches 610 could also include a packet-based "soft switch" that uses software control to provide voice, video, and/or data services by dynamically changing its connection data rates and protocols types. If the telecommunications network 620 and/or one of the switches 610 should include a softswitch, the AIN componentry is replaced by an application server that interfaces with the softswitch via a packet protocol, such as Session Initiation Protocol (SIP). The means of communicating the timed ring suppression profile between or among the receiving party's communications device 160, the timed ring suppression device 100, the switches 610 the telecommunications network 620 including AIN componentry, the data network 860 including the gateway 865, and the calling party's communications device 605 include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 802 standards, and Digital Subscriber Lines (DSL) are just some examples of the transmission means. The signaling between the receiving party's communications device 160, the timed ring suppression device 100, the switches 610, the telecommunications network 620 including AIN componentry, the data network 860 including the gateway 865, and the calling party's communications device 605, however, are well understood in by those of ordinary skill the art and will not be further described. Further, those of ordinary skill in the art will be able to apply the principles of this invention to their own network configurations which may differ substantially from the communications system(s) shown in the figures.

Once a call is placed from the calling party's communications device 605 to the receiving party's communications address (e.g., telephone number), the call is routed via switch 610 to telecommunications network 620 as described above. The incoming call and other communications signals (e.g., ICLID signal) associated with an address of calling party's communications device 605 arrive at SSP 820. The SSP suspends processing of the call and queries the SCP 830 to determine whether ring suppression is required. The SCP 830 queries the TRS DataServer 840 for further timed ring suppression profile processing and routing information. The TRS DataServer 840 accesses the database 845 of timed ring suppression profiles to determine if the receiving party's communications device subscribes to timed ring suppression and/or to obtain other preferences, instructions, files, and/or associated timed ring suppression data. Thereafter, the telecommunications network 620 may enable timed ring suppression via switch 610 to the receiving party's communications device 160. For example, the telecommunications network 620 may route the ICLID signal and activate an initial audible alert to the communications device 160 (according to the matched timed ring suppression profile or default timed ring suppression parameters). Thereafter, the telecommunications network silences subsequent rings (or another subsequent audible alert) according to the matched timed ring suppression profile (or defaults). Alternatively, the telecommunications network 620 may enable timed ring suppression via ISP 750 (or other connection) to the data network 860. The data network 860 then enables timed ring suppression via the gateway 865 to the receiving party's IP communications device (e.g., PC 800 and modem 810) via switch 610. Still, another alternative, is for the telecommunications network 620 to transmit controls that enable timed ring suppression directly to the gateway 865 (such as when the timed ring suppression profile associates a static IP address of the receiving party's IP communications device) to enable timed ring suppression of the receiving party's communications device via switch 610. In addition to enabling timed ring suppression profile, the telecommunications network 620 may also connect the calling party's communications device with the receiving party's communications device to establish an available connection. That is, when the receiving party is alerted (via the initial audible alert, the visual alert, and/or a subsequent alert after timed ring suppression) of the incoming communication, the receiving party can answer the incoming communication from the calling party. For example, the receiving party may review the Caller ID after the initial audible alert and see the lit display panel to know that the call is still on-hook (even though there isn't a continuous audible alert to indicate availability), and then decide to answer the call to have a conversation with the calling party.

Figure 9:
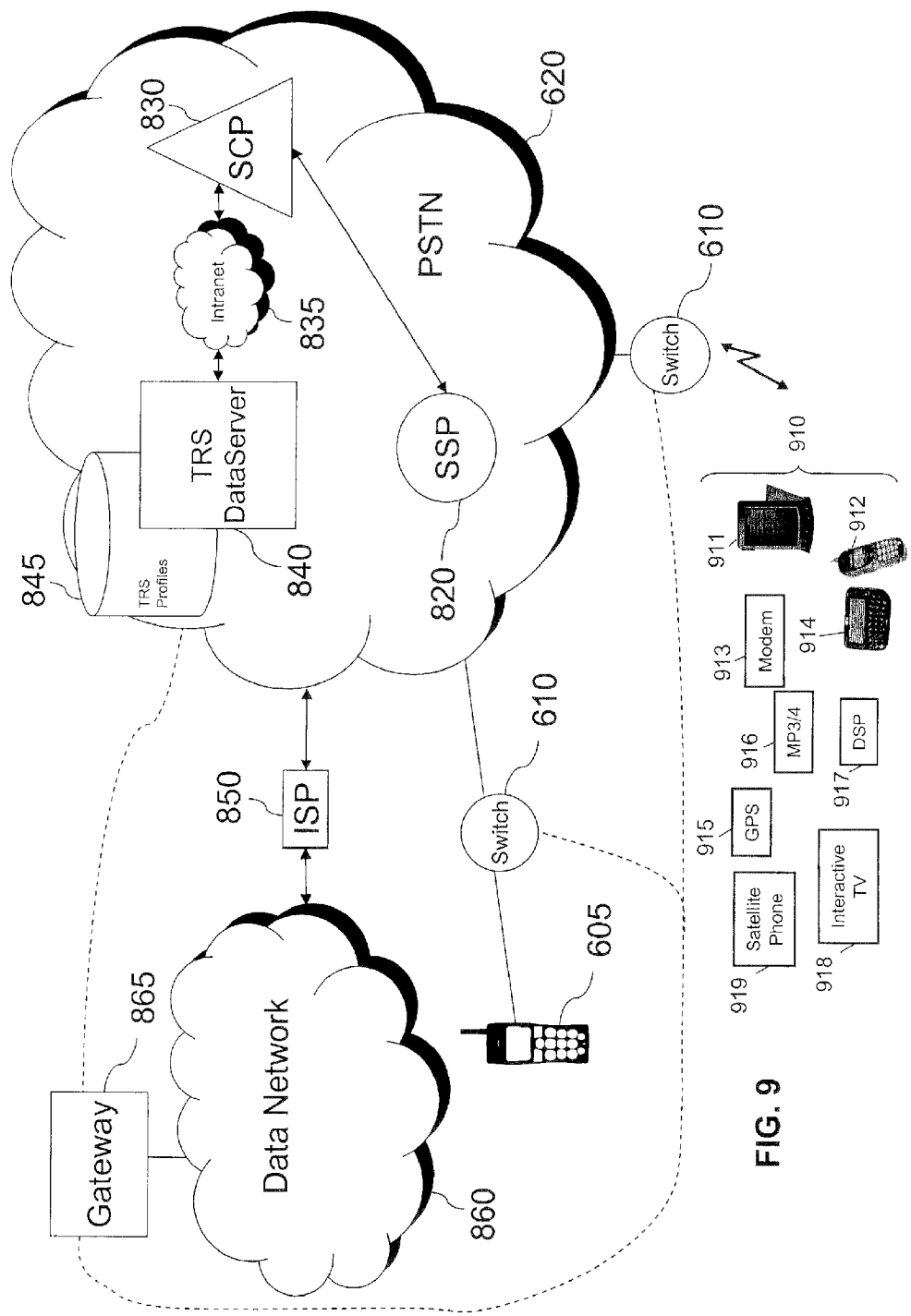
FIG. 9 is a schematic of a timed ring suppression system illustrating the communications connections of a calling party's telephone, one or more communications networks, and a plurality of various communications devices according to embodiments of this invention.

FIG. 9 is a schematic of a timed ring suppression communications system similar to the communications system disclosed in FIG. 8; however, the timed ring suppression communications system of FIG. 9 illustrates alternate receiving party's communications devices 910 that include a Personal Digital Assistant (PDA) 911, an IP phone 912, a modem 913, an interactive pager 914, a global positioning system (GPS) 915, an MP3/4 player 916, a digital signal processor (DSP) 917, an interactive television 918, and a satellite phone 919. Regardless of the receiving party's communications device (reference numerals 160, 530, 800, 810 and 911-919), the telecommunications network 620 enables timed ring suppression and enables communications with the receiving party's communications device (including audio, text (e.g., ASCII), video, other digital formats, and combination thereof). Accordingly, the telecommunications network may include and/or be coupled with a multi-protocol communications interface that acts as a gateway to enable timed ring suppression. For example, if the receiving party's communications device uses the Wireless Application Protocol (WAP) technique, then timed ring suppression is enable and communications use the Wireless Mark-up Language (WML) as known in the art. The Wireless Markup Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means.

This invention further provides for caller control systems and methods to override timed ring suppression. For example, the calling party may place an incoming call to a telephone number of the receiving party's communications device that has activated timed ring suppression (activated either by way of the customer's hardware and equipment—the timed ring suppression device 100—or by way of the communications network—the TRS services of PSTN 620). The calling party enters an interrupt code that authorizes interruption or disabling of timed ring suppression and connects the incoming call while maintaining a continuous alert/indicator of the incoming call, and, thus overrides suppression of the ringer 150 (or other indicator) according to the timing parameter. The interrupt code entered by the calling party is received in a communications network, such as, for example the Public Switched Telephone Network (PSTN) 620. Alternatively, the interrupt code may be received by another communications network, such as a mobile switching network, a satellite network, a data communications network (e.g., internet, intranet, and/or extranet), and other networks providing communications. The communications network detects, decodes, and processes the incoming communications signal and the interrupt code with a timed ring suppression profile associated with the receiving party's communications device. If the communications network verifies authorization to interrupt or disable timed ring suppression, then the incoming communications signal and/or an interrupt timed ring suppression signal are transmitted to the receiving party's communications device so that the incoming call is connected and the receiving party's communications device provides a continuous alert (e.g., ringing) despite the receiving party's communications device having activated timed ring suppression services (e.g., to silence subsequent alerts of an incoming communication according to a timed parameter). Further, the communications network may send a notification message to the receiving party's communications device to notify a user that timed ring suppression is interrupted and/or disabled. For example, the notification message may be sent instead of a caller identification message so that a caller identification device or the timed ring suppressor 100 (via screen 300) displays "TRS OVERRIDE" to alert the receiving party that the caller has disabled timed ring suppression.

According to an embodiment, a caller controlled timed ring suppression system includes a communications dataserver (such as TRS DataServer shown as reference numeral 840 in FIGS. 8-9) communicating with a communications network (such as Public Switched Telephone Network (PSTN) shown are reference numeral 620 in FIGS. 6, 8-9) for detecting, decoding, and communicating an incoming communications signal on a communications link from a calling party's communications device to a receiving party's communications device and includes a timed ring suppression application communicating with at least one of the communications network, the communications dataserver, and the receiving party's communications device. The communications dataserver stores a timed ring suppression profile that includes a telephone number, a directory name, a date/time identifier, a geographical identifier, a caller control interrupt code, and a timing parameter for suppressing a communications indicator of the receiving party's communications device after the receiving party's communications device activates the communications indicator to produce an initial alert of the incoming communications signal. The timed ring suppression application generates a timed ring suppression signal that is communicated to the receiving party's communications device (and/or to a switch) to suppress subsequent alerts by the communications indicator of the incoming communications signal according to the timed ring suppression profile. Further, the timed ring suppression application further generates an interrupt timed ring suppression signal in response to receiving the caller control interrupt code from a calling party. The interrupt timed ring suppression signal is communicated to the receiving party's communications device to temporarily disable the timed ring suppression signal such that the communications indicator maintains a continuous, uninterrupted alert of the uninterrupted, on-hook incoming communications signal. According to another embodiment, a caller controlled timed ring suppression system includes a calling party's communications device that transmits an incoming communications signal to a communications network, and the communications network communicates the incoming communications signal and/or an interrupt timed ring suppression signal to a receiving party's communications device. The communications network may process an incoming line identification (ICLID) signal of the incoming communications signal to generate an interrupt timed ring suppression signal and transmit the incoming communications signal and/or the interrupt timed ring suppression signal to the receiving party's communications device. Further, the interrupt timed ring suppression signal is communicated to the receiving party's communications device having a timed ring suppressor (externally coupled and/or integrated) and operates to override a timed ring suppressor of a timed ring suppression device such that when the incoming communications signal is communicated to the receiving party's communications device, the receiving party's communications device presents a continuous indicator of the incoming communications signal while the communications signal is in an uninterrupted, on-hook state.

Figure 10:
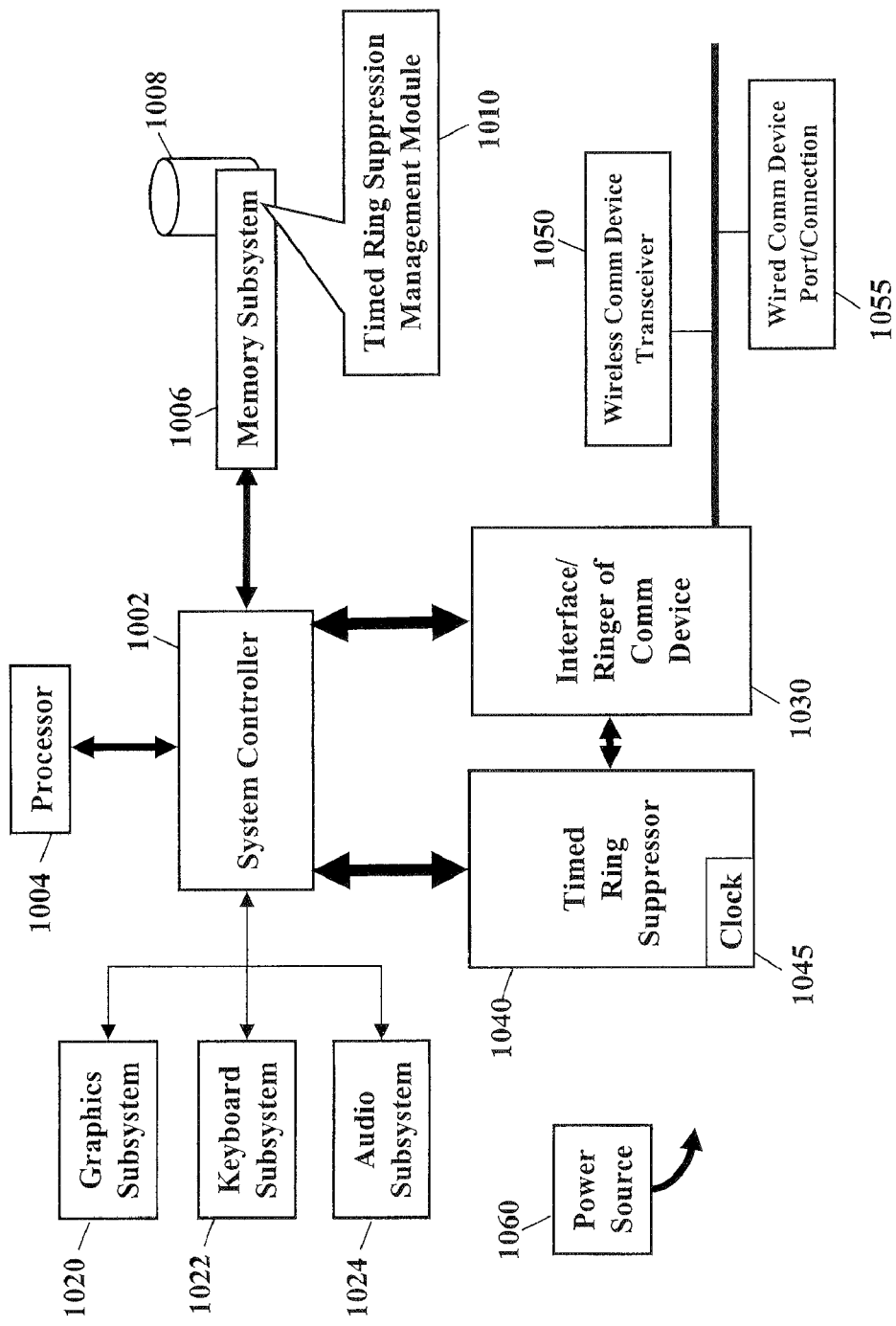
FIG. 10 is a block diagram of a timed ring suppressor device according to embodiments of this invention.

FIG. 10 is a block diagram showing another embodiment of the timed ring suppression device similar to the timed ring suppression device of FIG. 1; however the timed ring suppression device of FIG. 10 includes a system controller 1002, processor 1004, memory system 1006 including database 1008 and timed ring suppression management module 1010 (also referred to as the timed ring suppression program), graphics system 1020, keyboard system 1022, audio system 1024, an interface with a ringer of a communications device 1030, a timed ring suppressor 1040, a clock 1045, a wireless communications device transceiver 1050, a wired communications device port/connection 1055, and a power source 1060. The system controller 1002 provides a bridging function between the processor, the graphics subsystem 1020, the keyboard subsystem 1022, the audio subsystem 1024, the memory subsystem 1006, the timed ring suppressor 1014, and the interface 1030. The interface 1030 may include a peripheral bus controller that is an integrated circuit serving as an input/output hub for various peripheral ports. These peripheral ports enable the timed ring suppressor to control and to communicate with a variety of communications devices through Wireless Comm Device Transceiver 1030 (such as Wireless 802.11 and Infrared) and Wired Comm Device Port 1055 (such as modem V90+ and compact flash slots). In addition, the stored one or more timed ring suppression profiles may be stored by local memory system 1006 or by a peripheral storage device (such as TRS DataServer 840 shown in FIG. 8). According to an embodiment, the Comm Port 1055 may communicate with a communications network (such as reference numeral 520 of FIG. 5) and transmit the timed ring suppression profile. In an alternate embodiment, the Comm Port 1055 may format the timed ring suppression profile for a connected or integrated communications device (via the Wireless Comm Device Transceiver 1050 and/or Wired Comm Device Port/Connection 1055), and, the connected or integrated communications device would then initiate communications with the communications network and transmit the timed ring suppression profile (via the connected or integrated communications device). Still, in another alternated embodiment, the interface 1030 may include intelligent componentry that detects or otherwise identifies the receiving party's communications device and formats or otherwise configures the timed ring suppression profile or enables timed ring suppression for the receiving party's communications device.

Figure 11:
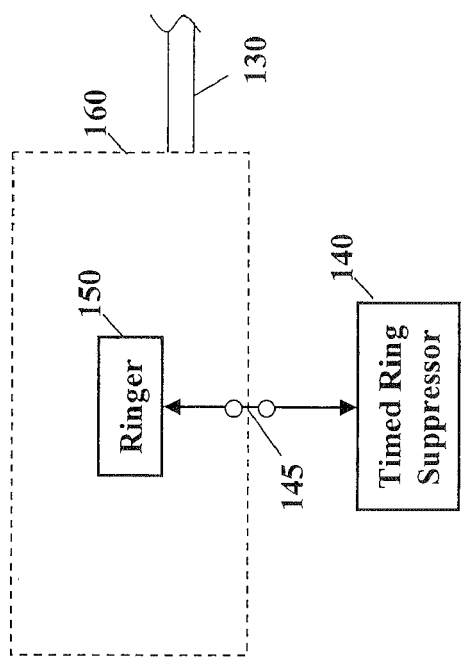
FIG. 11 is a block diagram of a timed ring suppressor device according to an alternate embodiment of this invention.

FIG. 11 is another block diagram of a manually-activated timed ring suppression device that includes the timed ring suppressor 140 and circuit 145 coupled with ringer 150 of telephone 160. The timed ring suppressor 140 is enabled to open circuit 145 to prevent current/voltage from flowing to the ringer 150, and, thus, silence subsequent ringing of an uninterrupted on-hook call after the call has initially activated the ringer. For example, the timed ring suppressor 140 could be a punch button that the customer presses after an incoming call produces an audible alert (e.g., a ring). Thereafter, subsequent ringing is suppressed for a selected timing parameter. For example, if the timing parameter is set at 12 seconds (approximately two ring cycles), then the customer could press the timed ring suppressor 140 to silence the ringer for 12 seconds, and, if the ringing resumed, then press the timed ring suppressor 140 again to silence the ringer for another 12 seconds.

Figure 12:
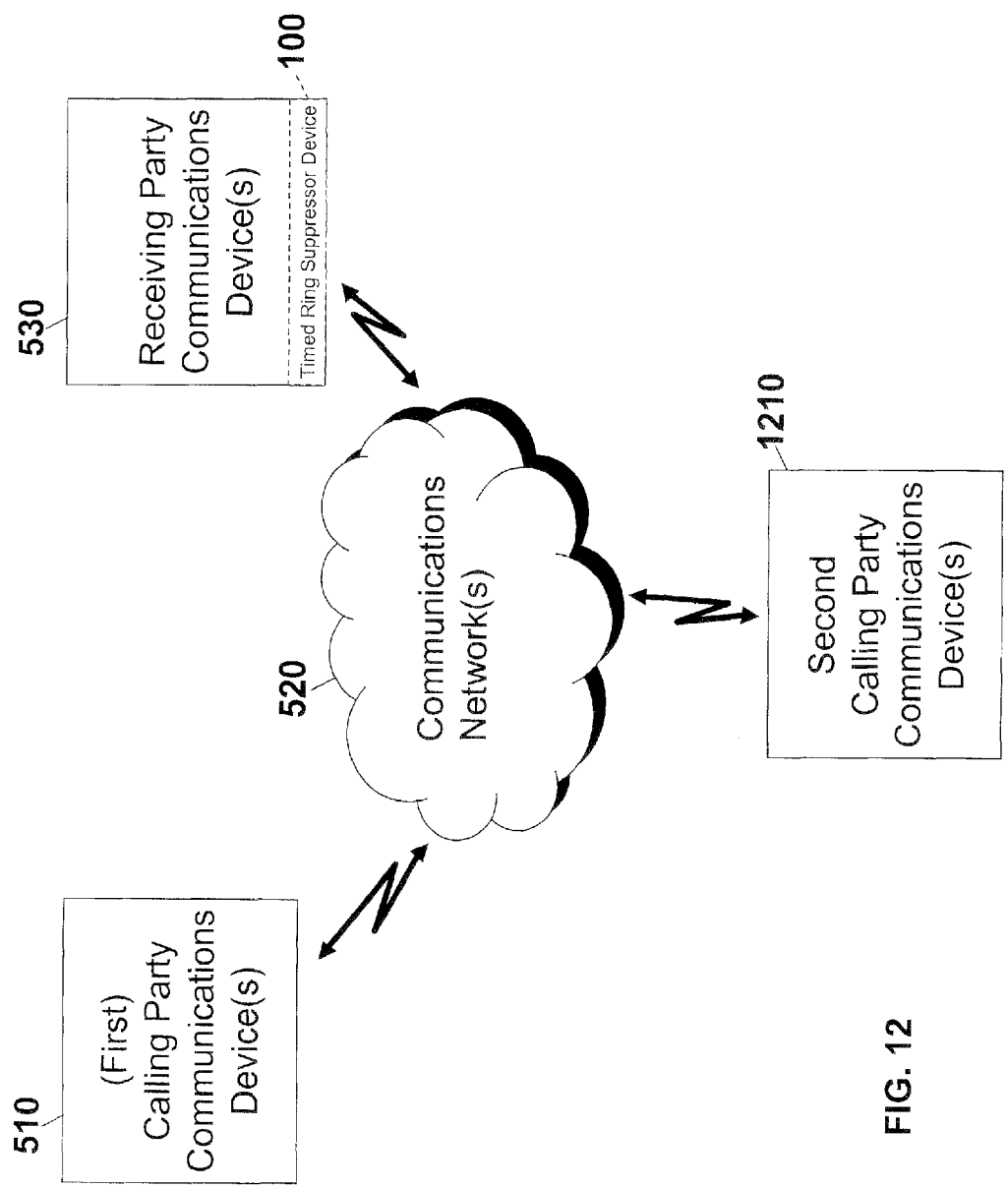
FIG. 12 is a schematic of a timed ring suppression system illustrating a communications network connecting a second calling party's communications device, the receiving party's communications device, and the (first) calling party's communications device according to embodiments of this invention.

Referring now to FIGS. 12-16, this invention addresses secondary incoming communications while the (first) incoming communication is timed ring suppressed as discussed in the above embodiments. FIG. 12 illustrates a timed ring suppression communications system similar to FIGS. 5 and 7; however, the timed ring suppression communications system of FIG. 12 further includes a second calling party's communications device 1210. The second calling party uses communications device 1210 to place a call (or other communication) over the communications network 520 to the receiving party's communications device 530 while a ringer (or other call alert) is timed ring suppressed for a first call from the first calling party. The ringer of the receiving party's communications device 530 produces an alert (either an alert similar to the notification of the first incoming call or a distinctive alert, such as a distinctive ring pattern (or alternate noise maker)) while the notification alert/indicator of the first incoming call is suppressed. Similar to above, an incoming line identification (ICLID) signal associated with the second incoming call is detected, decoded, and compared with one or more timed ring suppression profiles by the timed ring suppression device 100. The ICLID signal of the second incoming call may be matched with a second timed ring suppression profile, the timed ring suppression profile of the first incoming call, and/or with timed ring suppression defaults (such as whether to provide notification of the second incoming call during timed ring suppression of the first incoming call) to generate a supplanted timed ring suppression signal that activates an indicator/alert of the secondary incoming call. Thus, this invention provides for notification of the secondary call when the notification of the first call is suppressed. And so, this invention provides a pseudo-reverse call-waiting service referred to as "Second Call During Ring Suppression."

Figure 13:
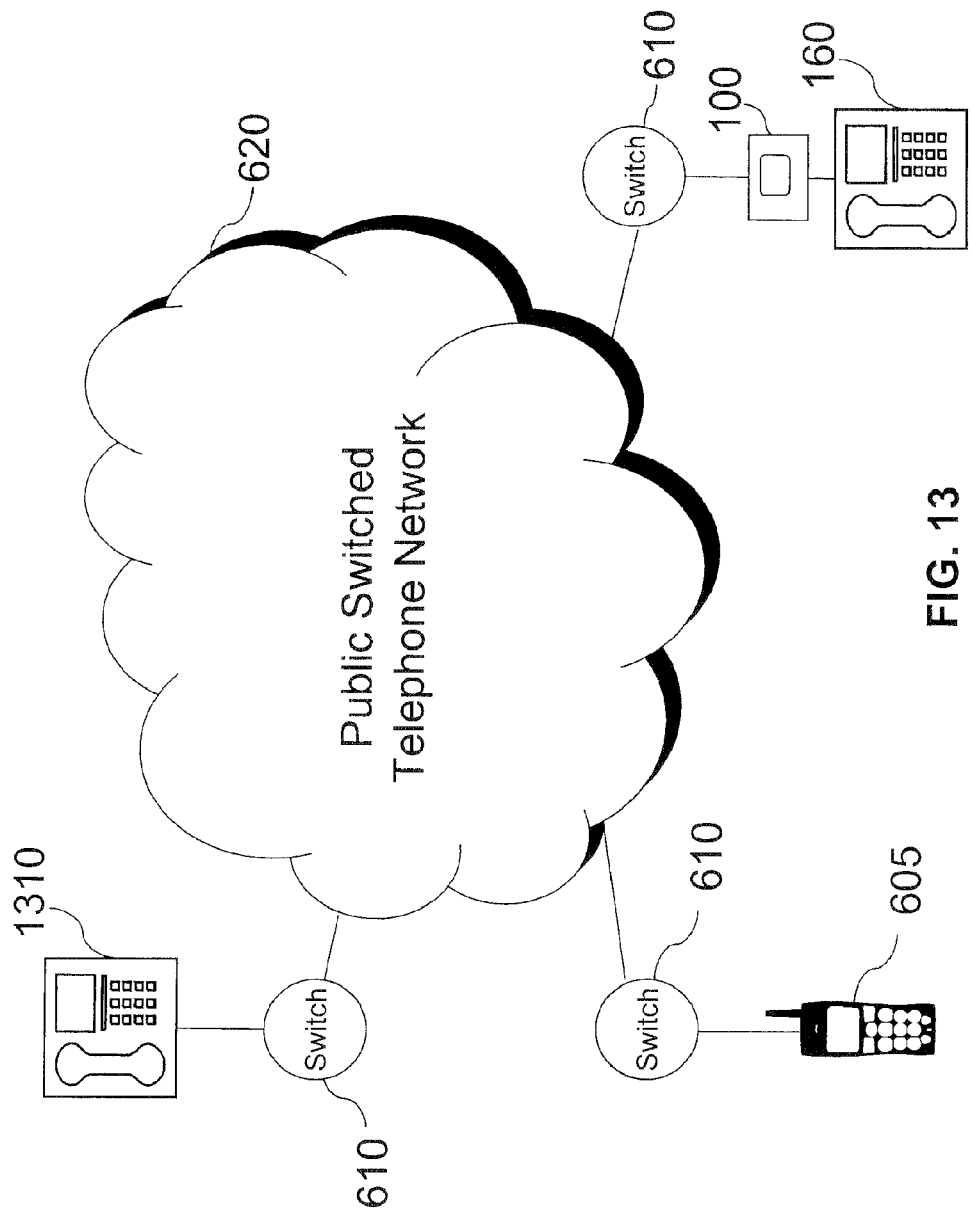
FIG. 13 is a schematic of a timed ring suppression system illustrating a public switched telephone network connecting a second calling party's communications device, the receiving party's communications device, and the (first) calling party's communications device according to embodiments of this invention.
Figure 14:
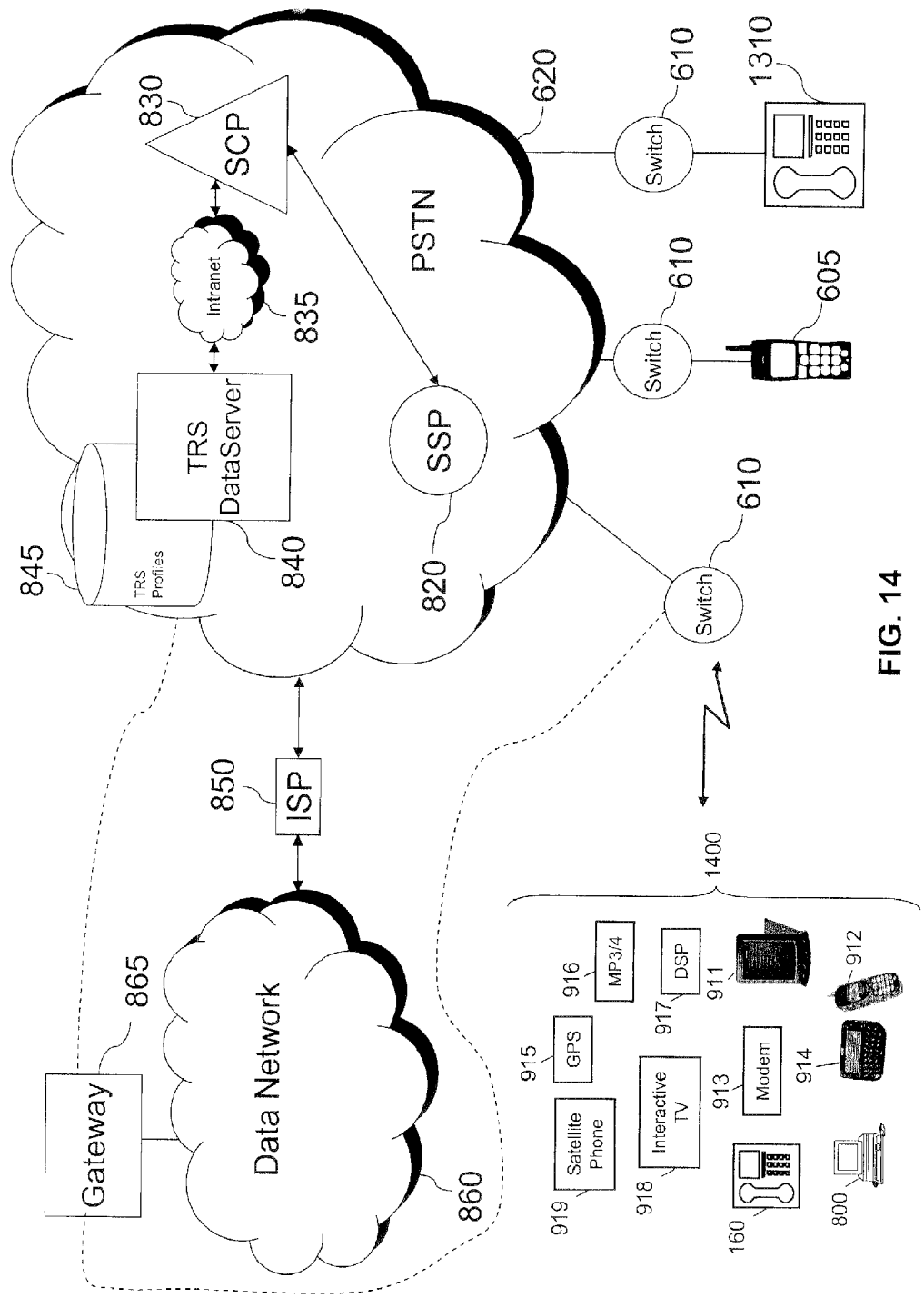
FIG. 14 is a schematic of a timed ring suppression system illustrating the communications connections of a second calling party's telephone, one or more communications networks, a plurality of various receiving party communications devices, and a (first) calling party's telephone according to embodiments of this invention.

FIG. 13 is similar to FIG. 6; however, the timed ring suppression communications system illustrates the second calling party's communications device as a POTS phone 1310 coupled with switch 610 to the PSTN 620. FIG. 14 illustrates a more detailed timed ring suppression communications system that makes use of one or more communications network to enable, disable, and/or otherwise manage notification of secondary incoming communications during timed ring suppression (similar to the communications system of FIG. 13). The communications system of FIG. 14 includes the second calling party's communications device 1310 (shown as POTS phone), the (first) calling party's communications device 605 (shown as a cellular telephone), the communications switches 610 connected to the PSTN 620 that includes the service switching point (SSP) 820, the service control point (SCP) 830, the Intranet 835, the timed ring suppression (TRS) Dataserver 840, the database of one or more timed ring suppression profiles 845, the Internet Service Provider (e.g., America On-Line) 850, the data network 860, the gateway 865, the destination communications switch 610, and one or more receiving party's communications device(s) 1400 shown as telephone 160, the personal computer 800, the Personal Digital Assistant (PDA) 911, the IP phone 912, the modem 913, the interactive pager 914, the global positioning system (GPS) 915, the MP3/4 player 916, the digital signal processor (DSP) 917, the interactive television 918, and the satellite phone 919. Regardless of the receiving party's communications device (reference numerals 160, 530, 800, 810 and 911-919), the telecommunications network 620 and/or the data network 860 enable Second Call During Ring Suppression to provide notification and routing of secondary communications to the receiving party's communications device (including audio, text (e.g., ASCII), video, other digital formats, and combination thereof).

Typically, a secondary call is placed from the second calling party's communications device 1310 to the receiving party's communications address (e.g., telephone number) and the secondary call is routed via switch 610 to telecommunications network 620 as described above. The secondary incoming call and other communications signals (e.g., ICLID signal) associated with an address of second calling party's communications device 1310 arrive at SSP 820. The SSP suspends processing of the secondary call and queries the SCP 830 to determine whether ring suppression is engaged for a first incoming call from the (first) calling party's communications device 605 as described above. This may involve switch 610 (or alternate communications network components) to identify both an uninterrupted, on-hook state of the receiving party's communications device and to identify a timed ring suppressed communication from the calling party's communications device 605. If ring suppression is engaged, the SCP 830 then queries the TRS DataServer 840 for Second Call During Ring Suppression processing and routing information. The TRS DataServer 840 accesses the database 845 of timed ring suppression profiles to obtain preferences, instructions, files, and/or associated Second Call During Ring Suppression data. Thereafter, the telecommunications network 620 may enable Second Call During Ring Suppression via switch 610 to the receiving party's communications device 160. For example, the telecommunications network 620 may route the ICLID signal of the secondary call and activate an audible alert (either similar to the alert for the first incoming call or a distinctive alert depending on Second Call During Timed Ring Suppression preferences) to the communications device 160 during timed ring suppression of the first incoming call. That is, the receiving party's communications device activates an audible alert, such as the ringer, to notify the receiving party of the secondary incoming call so that the receiving party can answer the secondary call while the first call is timed ring suppressed. Second Call During Ring Suppression may be particularly useful in situations when the customer receives a first call (and may be able to identify the caller from the ICLID and/or timed ring suppression signal) and wants to wait to answer the first call (kind of like putting the first call on temporary hold with timed alerts that remind the customer that the first call is timed ring suppressed). Then, the customer receives notification of a second call (either a similar alert or a distinctive alert) and answers the second call while the first call is suppressed. Thereafter, the customer can maintain the communications link with the second call and answer the suppressed first call (similar to answering secondary incoming calls of a call waiting service). Or, alternatively, the customer may activate (either via timed ring suppressor 100 or by a timed ring suppression profile of the telecommunications network 620) timed ring suppression of the second call. Still further, the customer may activate that no secondary calls are routed, notified, and/or communicated during timed ring suppression of a first call (i.e., if an incoming communication is suppressed, then all secondary communications are not connected to the communications address of the receiving party's communications device, and these secondary communications may be further processed according to other call handling options).

Figure 15:
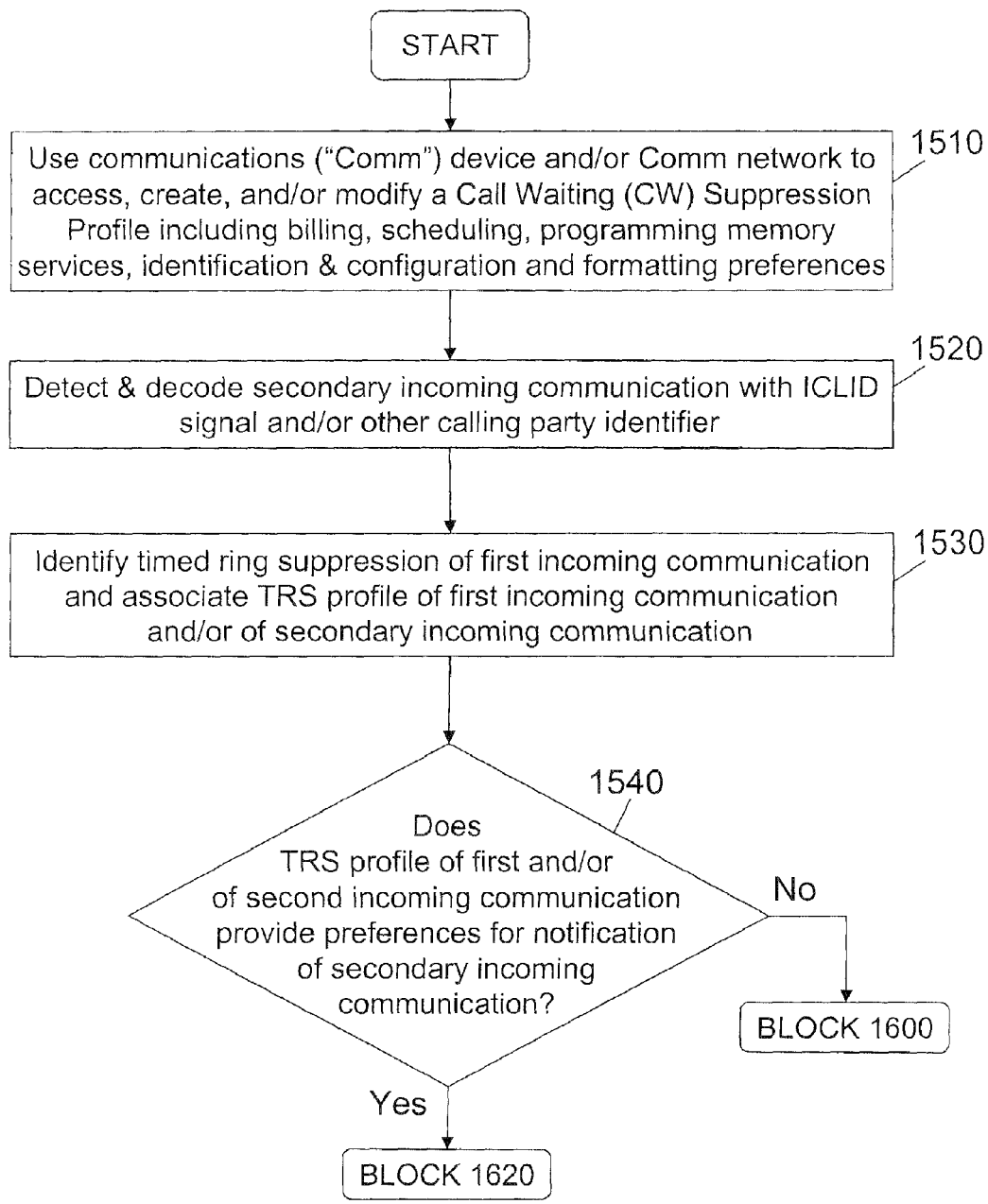
FIGS. 15-16 are flowcharts describing timed ring suppression according to embodiments of this invention.
Figure 16:
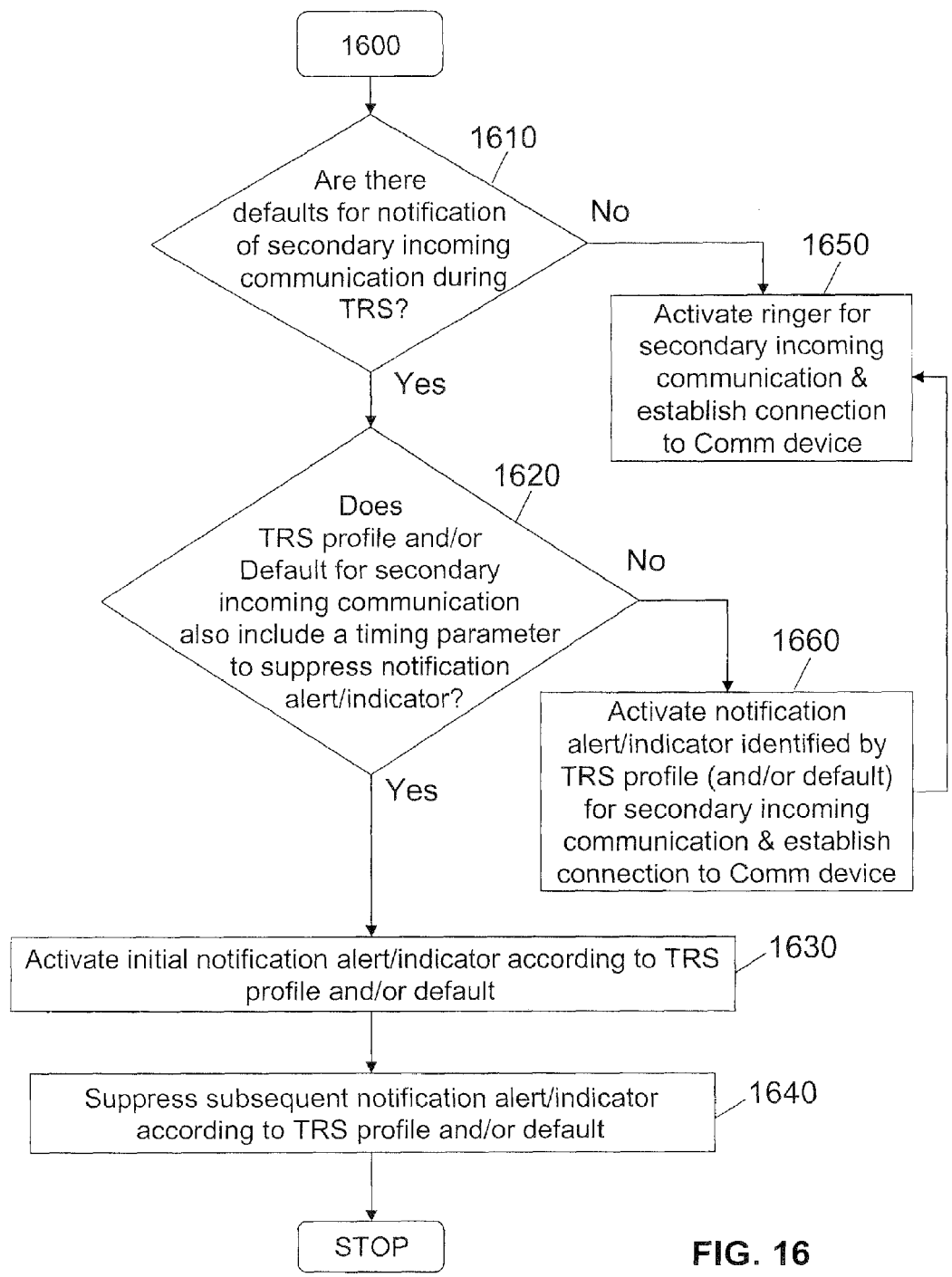

FIGS. 15 and 16 are flowcharts showing processes of providing Second Call During Ring Suppression according to embodiments of this invention. While the processes in FIGS. 15 and 16 are shown in series, these processes may occur in different orders and/or at simultaneous times as one of ordinary skill in the art will understand.

A customer (and/or telecommunications service provider personnel) uses a timed ring suppression device 100 (such as reference numeral 100 of FIG. 3) to access, create, modify, and/or otherwise manage a timed ring suppression profile to enable timed ring suppression including preferences for second call during timed ring suppression [block 1510]. Alternatively, the customer (and/or personnel) could use his/her communications device and a communications network (such as reference numerals 620 and 860 of FIG. 8) to access, create, modify, and/or otherwise manage a timed ring suppression profile. Once a secondary incoming call is detected, the ICLID signal (and/or other reference data of the secondary incoming call, such as data that identifies the secondary/other calling party) is decoded [block 1520] and compared with one or more timed ring suppression profiles including the timed ring suppression profile of the (first) incoming communication [block 1530]. If the timed ring suppression profile of the first incoming communication and/or the timed ring suppression profile of the secondary incoming communication specify notification preferences (e.g., times of day to activate alert/indicator, times of day to completely suppress alert/indicator of secondary incoming communication during TRS, selected notification alerts/ indicators for secondary incoming communication such as presenting Caller ID data of the secondary incoming communication while suppressing a ringer and selectively activating and deactivating other alerts/indicators of the secondary incoming communication) [block 1540], then the next step is to determine whether the TRS profile associated with the secondary incoming communication also includes a timing parameter to suppress the notification alert/indicator (e.g., audio, visual, and/or sensory indicators to notify the receiving party that there is an incoming communication) [block 1620]. If there is a timing parameter, then an initial notification alert/indicator is activated [block 1630] and subsequent notification alerts/indicators are suppressed according to the TRS profile associated with the secondary incoming communication [block 1640]. If there is not a timing parameter, then the notification alert/indicator identified by one or more TRS profiles is activated and a communications connection is established to the receiving party's communications device [block 1660].

If, however, the timed ring suppression profile of the first incoming communication and/or the secondary incoming communication does not specify notification preferences [block 1540], then the next step is to determine if there are defaults for notification of secondary incoming communications during timed ring suppression [block 1610]. If there are not any defaults, then the ringer (of the Comm device) is activated to provide notification of the secondary incoming communication and a communications connection is established so that the receiving party can answer [block 1650]. The ring pattern for the secondary incoming communication may be similar to the ring pattern of the first incoming communication or, alternatively, the ring pattern may be different like a distinctive ring to distinguish that there is a secondary incoming communication during ring suppression. If there are defaults, then the next step is to determine whether the TRS defaults associated with the secondary incoming communication include a timing parameter to suppress the notification alert/indicator [block 1620]. If there is a timing parameter, then an initial notification alert/indicator is activated [block 1630] and subsequent notification alerts/indicators are suppressed according to the TRS profile associated with the secondary incoming communication [block 1640]. If there is not a default timing parameter, then the notification alert indicator identified by the defaults is activated and a communications connection is established to the receiving party's communications device [block 1660].

While several exemplary implementations of embodiments of this invention are described herein, various modifications and alternate embodiments will occur to those of ordinary skill in the art. For example, the next generation "softswitch" simply replaces the SCP with an "application server." This application server is a conventional computer server that also includes triggers for telecommunications services so that "new entrants" into telecommunications services (e.g., new telecommunications service providers) don't have to purchase an expensive SSP and/or SCP to process telephone calls. This next-generation packet network represents an alternative operating environment for the network enabled timed ring suppression systems, methods, programs, and apparatuses. Here the telecommunications switch includes a packet-based "softswitch." This "softswitch" uses software control to provide voice, data, and video services by dynamically changing its connection data rates and protocols types. An application server interfaces with the "softswitch" via a packet protocol, such as Session Initiation Protocol (SIP). This application server includes voice service protocols, triggers, and operations that allow the PSTN and the data network (e.g., the world wide electronic communications network) to interoperate. Still, another example is using the timed ring suppression systems and methods to selectively activate and deactivate subsequent incoming call indicators (e.g., a vibrator, a lighted panel, a heat sensor, and/or other indicators to alert the customer of an incoming call) according to the timing parameter. Accordingly, this invention is intended to include those other variations, modifications, and alternate embodiments that adhere to the spirit and scope of this invention.

The invention claimed is:

1. A method, comprising:
receiving, by a mobile device, a first communication associated with a sender's address;
determining, by the mobile device, a suppression of audible alerts based on the sender's address;
generating, by the mobile device, a first audible alert of the audible alerts, the first audible alert for notification of the first communication;
receiving, by the mobile device, a subsequent communication after the first communication, the subsequent communication also associated with the sender's address; and
suppressing, by the mobile device, generation of the audible alerts associated with the subsequent communication.

2. The method of claim 1, further comprising processing a visual alert of the first communication on a display device.

3. The method of claim 1, further comprising processing a visual alert of the subsequent communication on a display device.

4. The method of claim 1, further comprising retrieving a timing parameter for suppressing subsequent ones of the audible alerts after the first audible alert.

5. The method of claim 1, further comprising querying an electronic database for the sender's address, the electronic database storing associations that relate timing parameters to addresses.

6. The method of claim 5, further comprising retrieving a timing parameter from the electronic database, the timing parameter having an association with the sender's address.

7. The method of claim 1, further comprising enabling the audible alerts after a time of silence since generating the first audible alert.

8. A system, comprising:
a processor; and
a memory device, the memory device storing instructions, the instructions when executed causing the processor to perform operations, the operations comprising:
receiving a first communication associated with a sender's address;
determining a suppression of audible alerts based on the sender's address;
generating a first audible alert of the audible alerts, the first audible alert for notification of the first communication;
receiving a subsequent communication after the first communication, the subsequent communication also associated with the sender's address; and
suppressing generation of all the audible alerts associated with the subsequent communication.

9. The system of claim 8, wherein the operations further comprise processing a visual alert of the first communication.

10. The system of claim 8, wherein the operations further comprise processing a visual alert of the subsequent communication.

11. The system of claim 8, wherein the operations further comprise retrieving a timing parameter for suppressing subsequent ones of the audible alerts after the first audible alert.

12. The system of claim 8, wherein the operations further comprise querying an electronic database for the sender's address, the electronic database storing associations that relate timing parameters to addresses.

13. The system of claim 12, wherein the operations further comprise retrieving a timing parameter from the electronic database, the timing parameter having an association with the sender's address.

14. The system of claim 8, wherein the operations further comprise enabling the audible alerts after a time of silence since generating the first audible alert.

15. A memory device storing instructions that when executed cause a processor to perform operations, the operations comprising:
receiving a first communication associated with a sender's address;
determining a suppression of audible alerts based on the sender's address;
generating a first audible alert of the audible alerts, the first audible alert for notification of the first communication;
receiving a subsequent communication after the first communication, the subsequent communication also associated with the sender's address; and
suppressing generation of the audible alerts associated with the subsequent communication.

16. The memory of claim 15, wherein the operations further comprise processing a visual alert of the first communication.

17. The memory of claim 15, wherein the operations further comprise processing a visual alert of the subsequent communication.

18. The memory of claim 15, wherein the operations further comprise retrieving a timing parameter for suppressing subsequent ones of the audible alerts after the first audible alert.

19. The memory of claim 15, wherein the operations further comprise querying an electronic database for the sender's address, the electronic database storing associations that relate timing parameters to different addresses.

20. The memory of claim 15, wherein the operations further comprise enabling the audible alerts after a time of silence since generating the first audible alert.

* * * * *